(12) United States Patent
Uejima et al.

(10) Patent No.: US 12,438,564 B2
(45) Date of Patent: Oct. 7, 2025

(54) RADIO FREQUENCY MODULE AND COMMUNICATION DEVICE

(71) Applicant: Murata Manufacturing Co., Ltd., Kyoto (JP)

(72) Inventors: Takanori Uejima, Kyoto (JP); Yuji Takematsu, Kyoto (JP); Dai Nakagawa, Kyoto (JP); Yukiya Yamaguchi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 429 days.

(21) Appl. No.: 18/302,032

(22) Filed: Apr. 18, 2023

(65) Prior Publication Data
US 2023/0261678 A1    Aug. 17, 2023

Related U.S. Application Data

(63) Continuation of application No. PCT/JP2021/030583, filed on Aug. 20, 2021.

(30) Foreign Application Priority Data

Nov. 13, 2020   (JP) .................. 2020-189693

(51) Int. Cl.
*H04B 7/00* (2006.01)
*H04B 1/00* (2006.01)
*H04B 1/04* (2006.01)

(52) U.S. Cl.
CPC ......... *H04B 1/0078* (2013.01); *H04B 1/0458* (2013.01)

(58) Field of Classification Search
CPC ...... H04B 1/0078; H04B 1/0458; H05K 1/00; H05K 1/0233; H05K 1/0243; H05K 1/111; H05K 1/16; H05K 1/181; H05K 1/183
See application file for complete search history.

(56) References Cited

U.S. PATENT DOCUMENTS 6,961,245 B2 * 11/2005 Ikuta ................... H01L 23/3677
                                                              257/713
9,372,293 B2 *  6/2016 Hirokubo ................. G01J 3/26
(Continued)

FOREIGN PATENT DOCUMENTS

JP   2001-352272 A   12/2001
JP   2004-135193 A    4/2004
(Continued)

OTHER PUBLICATIONS

International Search Report for PCT/JP2021/030583 dated Nov. 2, 2021.

*Primary Examiner* — Tuan Pham
(74) *Attorney, Agent, or Firm* — McDonald Hopkins LLC

(57) ABSTRACT

A radio frequency module is reduced in height. A radio frequency module includes a mounting substrate, a filter, and a conductive member. The mounting substrate has a first main surface and a second main surface opposite to each other. The filter is mounted on the first main surface of the mounting substrate. The conductive member covers at least part of a main surface of the filter on a side opposite to the mounting substrate. The first main surface of the mounting substrate has a recess. The main surface of the filter is in contact with the conductive member. At least part of the filter is positioned inside the recess.

20 Claims, 14 Drawing Sheets

(56) References Cited

U.S. PATENT DOCUMENTS

| | | |
|---|---|---|
| 2006/0151203 A1 | 7/2006 | Krueger et al. |
| 2009/0091904 A1 | 4/2009 | Hatanaka et al. |
| 2013/0026583 A1 | 1/2013 | Matsukawa et al. |
| 2014/0055215 A1* | 2/2014 | Rogers ............... H01P 1/20336 333/206 |
| 2014/0307394 A1 | 10/2014 | Lobianco et al. |
| 2020/0203291 A1 | 6/2020 | Uejima |
| 2020/0274489 A1 | 8/2020 | Nishizawa et al. |

FOREIGN PATENT DOCUMENTS

| | | |
|---|---|---|
| JP | 2005-536879 A | 12/2005 |
| JP | 2013-030850 A | 2/2013 |
| JP | 2015-023474 A | 2/2015 |
| JP | 2020-102693 A | 7/2020 |
| JP | 2020-137026 A | 8/2020 |
| WO | 2007/114224 A1 | 10/2007 |
| WO | 2014/013831 A1 | 1/2014 |

* cited by examiner

US 12,438,564 B2

RADIO FREQUENCY MODULE AND COMMUNICATION DEVICE

CROSS REFERENCE TO RELATED APPLICATION

This is a continuation of International Application No. PCT/JP2021/030583 filed on Aug. 20, 2021 which claims priority from Japanese Patent Application No. 2020-189693 filed on Nov. 13, 2020. The contents of these applications are incorporated herein by reference in their entireties.

BACKGROUND OF THE DISCLOSURE

Field of the Disclosure

The present disclosure generally relates to a radio frequency module and a communication device, and more particularly, to a radio frequency module including a mounting substrate and a communication device including the radio frequency module.

Description of the Related Art

Patent Document 1 discloses a module (radio frequency module) including a module substrate (mounting substrate), a duplexer (filter), and a metal film (conductive member).

In the module disclosed in Patent Document 1, the duplexer is mounted on an electrode provided on a mounting surface of the module substrate.

Patent Document 1: International Publication No. 2014/013831

BRIEF SUMMARY OF THE DISCLOSURE

It is hard to further reduce the height of a radio frequency module such as the module disclosed in Patent Document 1, since the filter is in contact with the metal film.

A possible benefit of the present disclosure is to provide a radio frequency module and a communication device that may be reduced in height.

A radio frequency module according to an aspect of the present disclosure includes a mounting substrate, a filter, and a conductive member. The mounting substrate has a first main surface and a second main surface opposite to each other. The filter is mounted on the first main surface of the mounting substrate. The conductive member covers at least part of a main surface of the filter on a side opposite to the mounting substrate. The first main surface of the mounting substrate has a recess. The main surface of the filter is in contact with the conductive member. At least part of the filter is positioned inside the recess.

A communication device according to an aspect of the present disclosure includes the radio frequency module described above and a signal processing circuit. The signal processing circuit is connected to the radio frequency module.

It is possible to reduce the height of the radio frequency module and the communication device according to the above-described aspects of the present disclosure.

DETAILED DESCRIPTION OF THE DISCLOSURE

Each of FIG. 1 to FIG. 3 and FIG. 5 to FIG. 14 referred to in the following embodiments and the like is a schematic diagram, and a ratio of dimensions or thicknesses of constituent elements in the diagram does not necessarily reflect an actual ratio in size.

Embodiment 1

Figure 1:
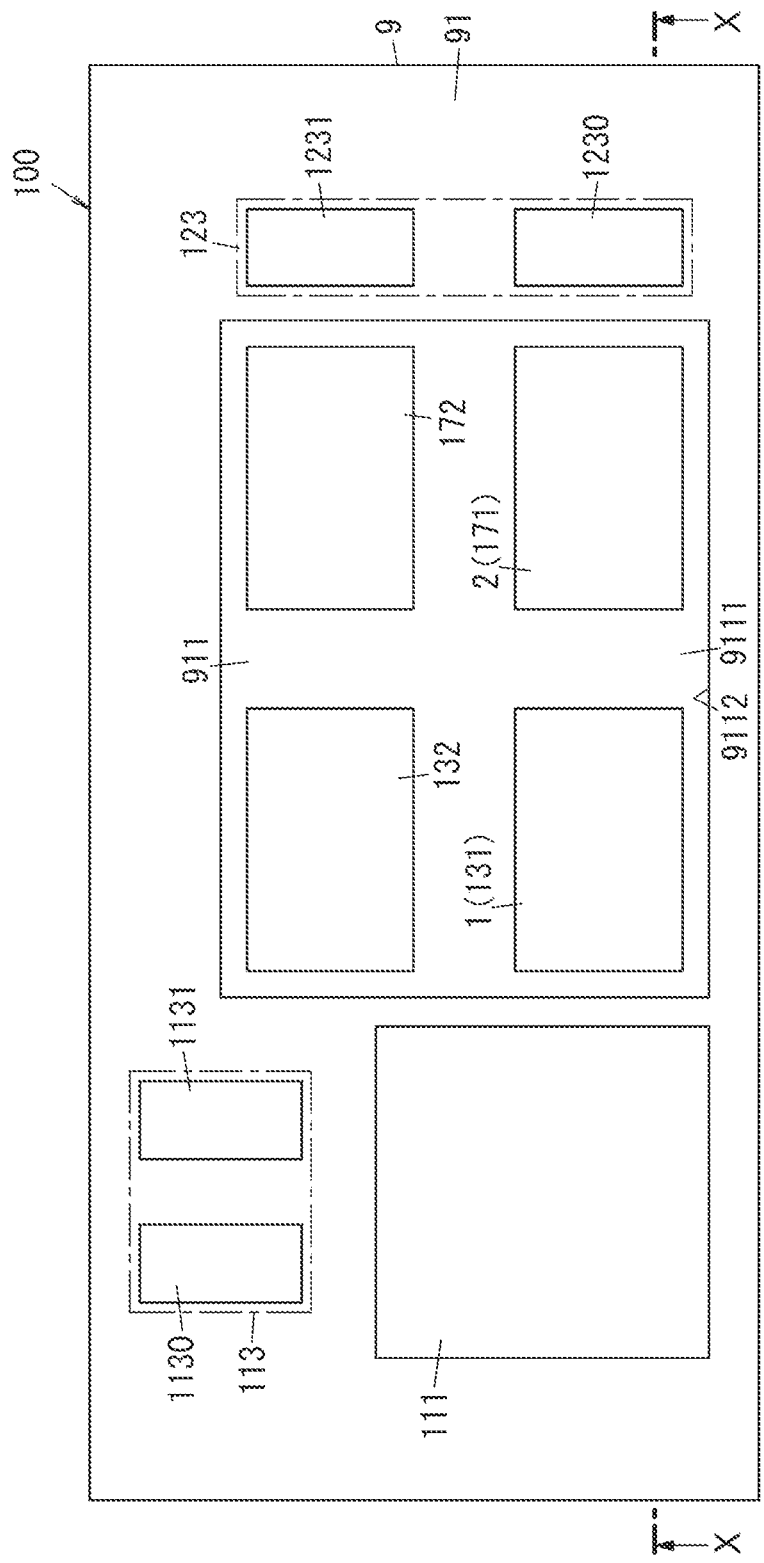
FIG. 1 is a plan view of a radio frequency module according to Embodiment 1.
Figure 2:
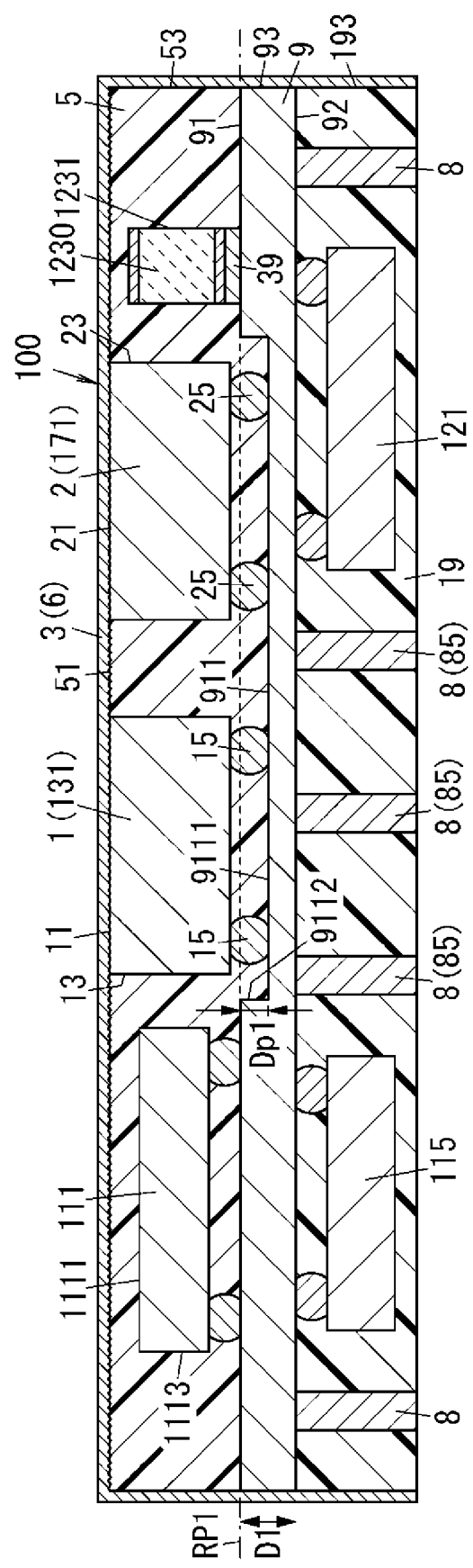
FIG. 2 is a sectional view of the radio frequency module according to Embodiment 1 taken along a line X-X in FIG. 1.
Figure 3:
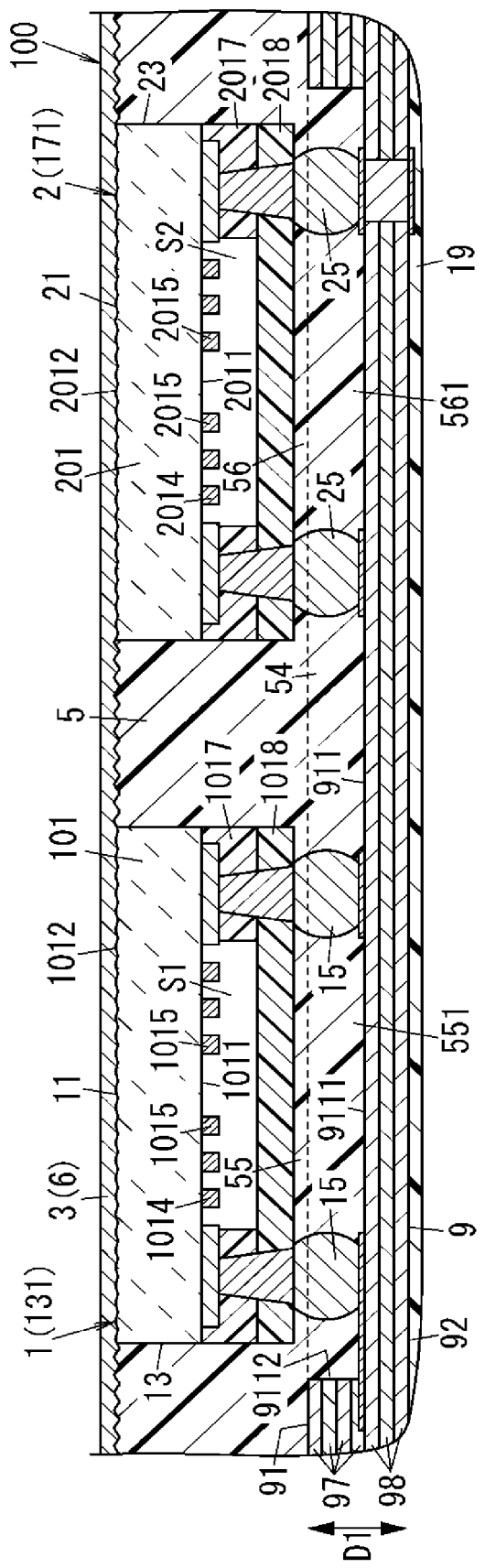
FIG. 3 is a partially enlarged sectional view of the radio frequency module according to Embodiment 1.

A radio frequency module 100 according to Embodiment 1 includes a mounting substrate 9, a filter 1, and a conductive layer 6 (see FIG. 2 and FIG. 3) as illustrated in FIG. 1 to FIG. 3, for example. The mounting substrate 9 has a first main surface 91 and a second main surface 92 opposite to each other. The filter 1 is mounted on the first main surface 91 of the mounting substrate 9. The conductive layer 6 covers a main surface 11 (see FIG. 2) of the filter 1 on a side opposite to the mounting substrate 9. In the radio frequency module 100, the conductive layer 6 constitutes a conductive member 3 that covers the main surface 11 of the filter 1 on the side opposite to the mounting substrate 9. Further, the radio frequency module 100 according to Embodiment 1 further includes a resin layer 5 (see FIG. 2). The resin layer 5 is disposed on the first main surface 91 of the mounting substrate 9 and covers an outer peripheral surface 13 (see FIG. 2) of the filter 1. The conductive layer 6 also covers a main surface 51 (see FIG. 2) of the resin layer 5 on the side opposite to the mounting substrate 9.

Further, the radio frequency module 100 according to Embodiment 1 further includes an electronic component 2 mounted on the first main surface 91 of the mounting substrate 9. The resin layer 5 covers an outer peripheral surface 23 (see FIG. 2) of the electronic component 2. The conductive layer 6 covers a main surface 21 (see FIG. 2) of the electronic component 2 on the side opposite to the mounting substrate 9.

Hereinafter, the radio frequency module 100 and a communication device 300 according to Embodiment 1 will be described in more detail with reference to FIG. 1 to FIG. 4.

(1) Radio Frequency Module and Communication Device (1.1) Circuit Configuration of Radio Frequency Module and Communication Device A circuit configuration of the radio frequency module 100 and the communication device 300 according to Embodiment 1 will be described with reference to FIG. 4.

The radio frequency module 100 is used in the communication device 300, for example. The communication device 300 is a mobile phone (smartphone, for example), for example, but is not limited thereto, and may be a wearable terminal (smartwatch, for example) or the like, for example. The radio frequency module 100 is a module capable of supporting the fourth generation mobile communication (4G) standard, the fifth generation mobile communication (5G) standard, or the like, for example. The 4G standard is the Third Generation Partnership Project (3GPP) Long Term Evolution (LTE) standard, for example. The 5G standard is 5G New Radio (NR), for example. The radio frequency module 100 is a module capable of supporting Carrier Aggregation and Dual Connectivity, for example.

The radio frequency module 100 is configured to amplify a transmission signal inputted from a signal processing circuit 301 and to output the amplified transmission signal to an antenna 310, for example. Further, the radio frequency module 100 is configured to amplify a reception signal inputted from the antenna 310 and to output the amplified reception signal to the signal processing circuit 301. The signal processing circuit 301 is not a constituent element of the radio frequency module 100, but a constituent element of the communication device 300 includes the radio frequency module 100. The radio frequency module 100 according to Embodiment 1 is controlled by the signal processing circuit 301 included in the communication device 300, for example. The communication device 300 includes the radio frequency module 100 and the signal processing circuit 301. The communication device 300 further includes the antenna 310. The communication device 300 further includes a circuit substrate on which the radio frequency module 100 is mounted. The circuit substrate is a printed wiring board, for example. The circuit substrate has a ground electrode to which ground electric potential is applied.

The signal processing circuit 301 includes an RF signal processing circuit 302 and a baseband signal processing circuit 303, for example. The RF signal processing circuit 302 is a radio frequency integrated circuit (RFIC), for example, and performs signal processing on a radio frequency signal. The RF signal processing circuit 302 performs signal processing such as up-conversion on a radio frequency signal (transmission signal) outputted from the baseband signal processing circuit 303, and outputs the radio frequency signal subjected to the signal processing, for example. Further, the RF signal processing circuit 302 performs signal processing such as down-conversion on a radio frequency signal (reception signal) outputted from the radio frequency module 100, and outputs the radio frequency signal subjected to the signal processing to the baseband signal processing circuit 303, for example. The baseband signal processing circuit 303 is a baseband integrated circuit (BBIC), for example. The baseband signal processing circuit 303 generates an I-phase signal and a Q-phase signal from a baseband signal. The baseband signal is an audio signal, an image signal, or the like inputted from the outside, for example. The baseband signal processing circuit 303 performs IQ modulation processing by combining the I-phase signal and the Q-phase signal, and outputs a transmission signal. At this time, the transmission signal is generated as a modulated signal (IQ signal) obtained by performing amplitude modulation to a carrier signal of a predetermined frequency with a period longer than the period of the carrier signal. The reception signal processed by the baseband signal processing circuit 303 is used as an image signal for image display or as an audio signal for a call of a user of the communication device 300, for example. The radio frequency module 100 transfers radio frequency signals (reception signal and transmission signal) between the antenna 310 and the RF signal processing circuit 302 of the signal processing circuit 301.

The radio frequency module 100 includes multiple (two, for example) transmission filters 131 and 132. Further, the radio frequency module 100 includes a power amplifier 111 and an output matching circuit 113. Furthermore, the radio frequency module 100 includes multiple (two, for example) reception filters 171 and 172. Still furthermore, the radio frequency module 100 includes a low-noise amplifier 121 and an input matching circuit 123. The input matching circuit 123 includes two inductors 1230 and 1231 (see FIG. 1), for example. Further, the radio frequency module 100 further includes a controller 115. Furthermore, the radio frequency module 100 includes a first switch 104, a second switch 105, and a third switch 106. In the radio frequency module 100, the transmission filter 131 constitutes the filter 1 described above. Further, in the radio frequency module 100, the reception filter 171 constitutes the electronic component 2 described above.

Furthermore, the radio frequency module 100 includes multiple outer connection terminals 8. The multiple outer connection terminals 8 include an antenna terminal 81, a signal input terminal 82, a signal output terminal 83, a control terminal 84, and multiple ground terminals 85 (see FIG. 2). Each of the multiple ground terminals 85 is a terminal electrically connected to the ground electrode of the above-described circuit substrate included in the communication device 300 to apply the ground electric potential.

Hereinafter, the circuit configuration of the radio frequency module 100 will be described in more detail with reference to FIG. 4.

The multiple transmission filters 131 and 132 are transmission filters whose pass bands are frequency bands different from each other. Hereinafter, when the two transmission filters 131 and 132 are distinguished from each other, the two transmission filters 131 and 132 may be referred to as a first transmission filter 131 and a second transmission filter 132, respectively.

The first transmission filter 131 is a filter whose pass band is a transmission band of a first communication band, for example. The second transmission filter 132 is a filter whose pass band is a transmission band of a second communication band, for example. The first communication band corresponds to a transmission signal passing through the first transmission filter 131. The second communication band corresponds to a transmission signal passing through the second transmission filter 132. Each of the first communication band and the second communication band is a communication band of the 3GPP LTE standard or a communication band of the 5G NR standard, for example.

The power amplifier 111 has an input terminal and an output terminal. The power amplifier 111 amplifies a transmission signal inputted to the input terminal and outputs the amplified transmission signal from the output terminal. The input terminal of the power amplifier 111 is connected to the signal input terminal 82. The input terminal of the power amplifier 111 is connected to the signal processing circuit 301 via the signal input terminal 82. The signal input terminal 82 is a terminal to input a radio frequency signal (transmission signal) from an outer circuit (signal processing circuit 301, for example) to the radio frequency module 100. In the radio frequency module 100, the output terminal of the power amplifier 111 may be connected to the first transmission filter 131 and the second transmission filter 132 via the output matching circuit 113 and the second switch 105. The second switch 105 has a common terminal 150 and multiple (two, for example) selection terminals 151 and 152. In the radio frequency module 100, the output terminal of the power amplifier 111 is connected to the common terminal 150 of the second switch 105 via the output matching circuit 113, and the two selection terminals 151 and 152 of the second switch 105 are connected to the two transmission filters 131 and 132 on a one-to-one basis. The power amplifier 111 is controlled by the controller 115.

The power amplifier 111 is a multistage amplifier including a driver stage amplifier and a final stage amplifier, for example. In the power amplifier 111, an input terminal of the driver stage amplifier is connected to the signal input terminal 82, an output terminal of the driver stage amplifier is connected to an input terminal of the final stage amplifier, and an output terminal of the final stage amplifier is connected to the output matching circuit 113. The power amplifier 111 is not limited to a multistage amplifier, and may be an in-phase composite amplifier or a differential composite amplifier, for example.

The controller 115 controls the power amplifier 111 in accordance with a control signal from the signal processing circuit 301, for example. The controller 115 is connected to the driver stage amplifier and an output stage amplifier of the power amplifier 111, for example. The controller 115 is connected to the signal processing circuit 301 via multiple (four, for example) control terminals 84. The control terminal 84 is a terminal to input a control signal from an outer circuit (signal processing circuit 301, for example) to the controller 115. The controller 115 controls the power amplifier 111 based on a control signal acquired through the control terminal 84. The control signal that the controller 115 acquires through the control terminal 84 is a digital signal. The number of control terminals 84 is four, for example. Only one of the four control terminals 84 is illustrated in FIG. 4. The controller 115 supplies a first bias current to the driver stage amplifier and a second bias current to the output stage amplifier, for example, based on the control signal from the signal processing circuit 301.

The output matching circuit 113 is provided in a signal path between the output terminal of the power amplifier 111 and the common terminal 150 of the second switch 105. The output matching circuit 113 is a circuit for impedance matching of the power amplifier 111 and the two transmission filters 131 and 132. The output matching circuit 113 includes multiple (two, for example) inductors 1130 and 1131 (see FIG. 1). The output matching circuit 113 may include one or multiple capacitors in addition to the multiple inductors 1130 and 1131, for example. Further, the output matching circuit 113 is not limited to a configuration including the multiple inductors 1130 and 1131, and may be a configuration including only one inductor 1130, for example.

The multiple reception filters 171 and 172 are reception filters whose pass bands are frequency bands different from each other. Hereinafter, when the two reception filters 171 and 172 are distinguished from each other, the two reception filters 171 and 172 may be referred to as a first reception filter 171 and a second reception filter 172, respectively.

The first reception filter 171 is a filter whose pass band is a reception band of the first communication band, for example. The second reception filter 172 is a filter whose pass band is a reception band of the second communication band, for example. The first communication band corresponds to a reception signal passing through the first reception filter 171. The second communication band corresponds to a reception signal passing through the second reception filter 172. Each of the first communication band and the second communication band is a communication band of the 3GPP LTE standard or a communication band of the 5G NR standard, for example. Note that, in the radio frequency module 100, the first transmission filter 131 and the first reception filter 171 constitute a first duplexer. Further, in the radio frequency module 100, the second transmission filter 132 and the second reception filter 172 constitute a second duplexer.

The low-noise amplifier 121 has an input terminal and an output terminal. The low-noise amplifier 121 amplifies a reception signal inputted to the input terminal and outputs the amplified reception signal from the output terminal. The input terminal of the low-noise amplifier 121 is connected to a common terminal 160 of the third switch 106 via the input matching circuit 123. The output terminal of the low-noise amplifier 121 is connected to the signal output terminal 83. The output terminal of the low-noise amplifier 121 is connected to the signal processing circuit 301 via the signal output terminal 83, for example. The signal output terminal 83 is a terminal to output a radio frequency signal (reception signal) from the low-noise amplifier 121 to an outer circuit (signal processing circuit 301, for example). In the radio frequency module 100, the input terminal of the low-noise amplifier 121 may be connected to the first reception filter 171 and the second reception filter 172 via the input matching circuit 123 and the third switch 106. The third switch 106 has the common terminal 160 and multiple (two, for example) selection terminals 161 and 162. In the radio frequency module 100, the input terminal of the low-noise amplifier 121 is connected to the common terminal 160 of the third switch 106 via the input matching circuit 123, and the two selection terminals 161 and 162 of the third switch 106 are connected to the two reception filters 171 and 172 on a one-to-one basis.

The input matching circuit 123 is a circuit for the impedance matching of the low-noise amplifier 121 and the two reception filters 171 and 172. The input matching circuit 123 includes multiple (two, for example) inductors 1230 and 1231 (see FIG. 1). The input matching circuit 123 may include multiple capacitors in addition to the multiple inductors 1230 and 1231, for example. Further, the input matching circuit 123 is not limited to a configuration including the multiple inductors 1230 and 1231, and may be a configuration including only one inductor 1230, for example. Furthermore, the radio frequency module 100 may include multiple (two) input matching circuits 123. In this case, each of the two input matching circuits 123 may be provided between the low-noise amplifier 121 and each of the two reception filters 171 and 172.

The first switch 104 has a common terminal 140 and multiple (two, for example) selection terminals 141 and 142. In the first switch 104, the common terminal 140 is connected to the antenna terminal 81. The radio frequency module 100 is not limited to the case that the common terminal 140 and the antenna terminal 81 are connected to each other with no other circuit element in-between, but may be connected to each other via a low pass filter and a coupler, for example. The selection terminal 141 is connected to a node of the output terminal of the first transmission filter 131 and the input terminal of the first reception filter 171. The selection terminal 142 is connected to a node of the output terminal of the second transmission filter 132 and the input terminal of the second reception filter 172. The first switch 104 is a switch capable of connecting at least one or more of the two selection terminals 141 and 142 to the common terminal 140, for example. Here, the first switch 104 is a switch capable of one-to-one and one-to-many connections, for example.

The first switch 104 is controlled by the signal processing circuit 301, for example. The first switch 104 changes over a connection state of the common terminal 140 and the two selection terminals 141 and 142 in accordance with a control signal from the RF signal processing circuit 302 of the signal processing circuit 301. The first switch 104 is a switch integrated circuit (IC), for example.

The second switch 105 has the common terminal 150 and the multiple (two, for example) selection terminals 151 and 152. In the second switch 105, the common terminal 150 is connected to the output terminal of the power amplifier 111 via the output matching circuit 113. The selection terminal 151 is connected to an input terminal of the first transmission filter 131. The selection terminal 152 is connected to an input terminal of the second transmission filter 132. The second switch 105 is a switch capable of connecting at least one or more of the two selection terminals 151 and 152 to the common terminal 150, for example. Here, the second switch 105 is a switch capable of one-to-one and one-to-many connections, for example.

The second switch 105 is controlled by the signal processing circuit 301, for example. The second switch 105 changes over a connection state of the common terminal 150 and the two selection terminals 151 and 152 in accordance with a control signal from the RF signal processing circuit 302 of the signal processing circuit 301. The second switch 105 is a switch IC, for example.

The third switch 106 has a common terminal 160 and multiple (two, for example) selection terminals 161 and 162. In the third switch 106, the common terminal 160 is connected to the input terminal of the low-noise amplifier 121 via the input matching circuit 123. The selection terminal 161 is connected to an output terminal of the first reception filter 171. The selection terminal 162 is connected to an output terminal of the second reception filter 172. The third switch 106 is a switch capable of connecting at least one or more of the two selection terminals 161 and 162 to the common terminal 160, for example. Here, the third switch 106 is a switch capable of one-to-one and one-to-many connections, for example.

The third switch 106 is controlled by the signal processing circuit 301, for example. The third switch 106 changes over a connection state of the common terminal 160 and the two selection terminals 161 and 162 in accordance with a control signal from the RF signal processing circuit 302 of the signal processing circuit 301. The third switch 106 is a switch IC, for example.

(1.2) Structure of Radio Frequency Module

The radio frequency module 100 includes the mounting substrate 9 and two transmission filters 131 and 132 as illustrated in FIG. 1 to FIG. 3. Further, the radio frequency module 100 includes the power amplifier 111, the output matching circuit 113, and the controller 115. Furthermore, the radio frequency module 100 includes the two reception filters 171 and 172, the low-noise amplifier 121, the input matching circuit 123, the first switch 104 (see FIG. 4), the second switch 105 (see FIG. 4), and the third switch 106 (see FIG. 4). Still furthermore, the radio frequency module 100 includes multiple outer connection terminals 8.

The mounting substrate 9 has the first main surface 91 and the second main surface 92 opposite to each other in a thickness direction D1 of the mounting substrate 9. The mounting substrate 9 is a multilayer substrate including multiple dielectric layers and multiple conductive layers, for example. The multiple dielectric layers and the multiple conductive layers are laminated in the thickness direction D1 of the mounting substrate 9. The multiple conductive layers are formed in a predetermined pattern designated for each layer. Each of the multiple conductive layers includes one or multiple conductive portions in one plane perpendicular to the thickness direction D1 of the mounting substrate 9. The material of each conductive layer is copper, for example. The multiple conductive layers include a ground layer. In the radio frequency module 100, the multiple ground terminals 85 and the ground layer are electrically connected to each other through a via conductor or the like of the mounting substrate 9. The mounting substrate 9 is a low temperature co-fired ceramics (LTCC) substrate, for example. The mounting substrate 9 is not limited to the LTCC substrate and may be a printed wiring board, a high temperature co-fired ceramics (HTCC) substrate, or a resin multilayer substrate, for example.

Further, the mounting substrate 9 is not limited to the LTCC substrate and may be a wiring structural body, for example. The wiring structural body is a multilayer structural body, for example. The multilayer structural body includes at least one insulation layer and at least one conductive layer. The insulation layer is formed in a predetermined pattern. In a case that multiple insulation layers are present, the multiple insulation layers each are formed in a predetermined pattern designated for each layer. The conductive layer is formed in a predetermined pattern different from the predetermined pattern of the insulation layer. In a case that multiple conductive layers are present, the multiple conductive layers each are formed in a predetermined pattern designated for each layer. The conductive layer may include one or multiple redistribution portions. In a wiring structural body, of two surfaces of a multilayer structural body opposite to each other in a thickness direction, a first surface is the first main surface 91 of the mounting substrate 9, and a second surface is the second main surface 92 of the mounting substrate 9. The wiring structural body may be an interposer, for example. The interposer may be an interposer using a silicon substrate, or may be a substrate formed of multiple layers.

The first main surface 91 and the second main surface 92 of the mounting substrate 9 are separated from each other in the thickness direction D1 of the mounting substrate 9 and each intersect with the thickness direction D1 of the mounting substrate 9. The first main surface 91 of the mounting substrate 9 is perpendicular to the thickness direction D1 of the mounting substrate 9, for example, but may include a side surface of a conductive portion or the like as a surface not perpendicular to the thickness direction D1, for example. Further, the second main surface 92 of the mounting substrate 9 is perpendicular to the thickness direction D1 of the mounting substrate 9, for example, but may include a side surface of a conductive portion or the like as a surface not perpendicular to the thickness direction D1. Furthermore, on the first main surface 91 and the second main surface 92 of the mounting substrate 9, a fine irregularity, a projection, or a recess may be formed. For example, in a case that a recess 911 is formed on the first main surface 91 of the mounting substrate 9, an inner surface (bottom surface 9111 and inner peripheral surface 9112) of the recess 911 is included in the first main surface 91.

In the radio frequency module 100 according to Embodiment 1, first group circuit components among multiple circuit components are mounted on the first main surface 91 of the mounting substrate 9. The first group circuit components include the two transmission filters 131 and 132, the power amplifier 111, the two inductors 1130 and 1131 of the output matching circuit 113, the two reception filters 171 and 172, and the two inductors 1230 and 1231 of the input matching circuit 123 as illustrated in FIG. 1. "A circuit component is mounted on the first main surface 91 of the mounting substrate 9" includes a case that a circuit component is disposed on (mechanically connected to) the first main surface 91 of the mounting substrate 9, and a case that a circuit component is electrically connected to (an appropriate conductive portion of) the mounting substrate 9. In the radio frequency module 100, second group circuit components among the multiple circuit components are mounted on the second main surface 92 of the mounting substrate 9. The second group circuit components include the controller 115, the low-noise amplifier 121, the first switch 104, the second switch 105, and the third switch 106. "A circuit component is mounted on the second main surface 92 of the mounting substrate 9" includes a case that a circuit component is disposed on (mechanically connected to) the second main surface 92 of the mounting substrate 9, and a case that a circuit component is electrically connected to (an appropriate conductive portion of) the mounting substrate 9. In the radio frequency module 100 according to Embodiment 1, as described above, the transmission filter 131 constitutes the filter 1, and the reception filter 171 constitutes the electronic component 2.

Each of the two transmission filters 131 and 132 is a ladder filter, for example, and includes multiple (four, for example) series arm resonators and multiple (three, for example) parallel arm resonators. Each of the two transmission filters 131 and 132 is an acoustic wave filter, for example. In the acoustic wave filter, each of the multiple series arm resonators and the multiple parallel arm resonators is constituted of an acoustic wave resonator. The acoustic wave filter is a surface acoustic wave filter using a surface acoustic wave, for example. In the surface acoustic wave filter, each of the multiple series arm resonators and the multiple parallel arm resonators is a surface acoustic wave (SAW) resonator, for example.

The two transmission filters 131 and 132 are mounted on the first main surface 91 of the mounting substrate 9 as illustrated in FIG. 1. In plan view in the thickness direction D1 of the mounting substrate 9, an outer peripheral shape of each of the two transmission filters 131 and 132 is a quadrangle. The transmission filter 131 constituting the filter 1 includes a substrate 101 and a circuit portion 1014 as illustrated in FIG. 3, for example. The substrate 101 has a first main surface 1011 and a second main surface 1012 opposite to each other in a thickness direction of the substrate 101. The circuit portion 1014 includes multiple interdigital transducer (IDT) electrodes 1015 formed on the first main surface 1011 of the substrate 101. Further, the transmission filter 131 includes a spacer layer 1017, a cover member 1018, and multiple outer electrodes 15 as constituent elements of a package structure. The transmission filter 131 has a rectangular shape in plan view in the thickness direction D1 of the mounting substrate 9, but is not limited thereto, and may have a square shape, for example. In the transmission filter 131, the substrate 101 is a piezoelectric substrate, and is a lithium tantalate substrate or a lithium niobate substrate, for example.

The spacer layer 1017 is provided on the substrate 101 on a side of the first main surface 1011. The spacer layer 1017 surrounds the multiple IDT electrodes 1015 in plan view in the thickness direction of the substrate 101. In plan view in the thickness direction of the substrate 101, the spacer layer 1017 has a rectangular frame shape. The spacer layer 1017 has an electrical insulation property. A material of the spacer layer 1017 is epoxy resin, polyimide, or the like. The cover member 1018 has a flat plate shape. The cover member 1018 is disposed on the spacer layer 1017 to face the substrate 101 in the thickness direction of the substrate 101. The cover member 1018 overlaps with the multiple IDT electrodes 1015 in the thickness direction of the substrate 101, and is separated from the multiple IDT electrodes 1015 in the thickness direction of the substrate 101. The cover member 1018 has an electrical insulation property. A material of the cover member 1018 is epoxy resin, polyimide, or the like. The transmission filter 131 has a space S1 surrounded by the substrate 101, the spacer layer 1017, and the cover member 1018. The space S1 contains a gas. The gas is air, an inert gas (nitrogen gas, for example), or the like. The multiple outer electrodes 15 are exposed from the cover member 1018.

A structure of the second transmission filter 132 is the same as a structure of the first transmission filter 131.

The power amplifier 111 is an IC chip for power amplification. The power amplifier 111 is mounted on the first main surface 91 of the mounting substrate 9 as illustrated in FIG. 1 and FIG. 2. In plan view in the thickness direction D1 of the mounting substrate 9, the outer peripheral shape of the power amplifier 111 is a quadrangle. The power amplifier 111 is an IC chip including a substrate having a first main surface and a second main surface opposite to each other and a circuit portion formed on the substrate on a side of the first main surface. The substrate is a gallium arsenide substrate, for example. The circuit portion includes the driver stage amplifier connected to the input terminal of the power amplifier 111 and the final stage amplifier connected to the output terminal of the driver stage amplifier. Each of the driver stage amplifier and the final stage amplifier includes an amplification transistor. The amplification transistor is a heterojunction bipolar transistor (HBT), for example. The power amplifier 111 may include a capacitor to cut a direct current, for example. The power amplifier 111 is flip-chip mounted on the first main surface 91 of the mounting substrate 9 such that the first main surface among the first main surface and the second main surface of the substrate faces the first main surface 91 of the mounting substrate 9. Accordingly, in the power amplifier 111, the second main surface of the substrate (gallium arsenide substrate) included in the power amplifier 111 constitutes a main surface 1111 (see FIG. 2) of the power amplifier 111 on the side opposite to the mounting substrate 9. In plan view in the thickness direction D1 of the mounting substrate 9, the outer peripheral shape of the power amplifier 111 is a quadrangle. The substrate in the power amplifier 111 is not limited to the gallium arsenide substrate, and may be a silicon substrate, a silicon germanium substrate, or a gallium nitride substrate, for example. Further, the amplification transistor is not limited to the HBT, but may be a bipolar transistor or a field effect transistor (FET). The FET is a metal-oxide-semiconductor field effect transistor (MOSFET), for example.

The two inductors 1130 and 1131 included in the output matching circuit 113 are mounted on the first main surface 91 of the mounting substrate 9. In plan view in the thickness direction D1 of the mounting substrate 9, the outer peripheral shape of each of the two inductors 1130 and 1131 is a quadrangle. Each of the two inductors 1130 and 1131 is a chip inductor. The output matching circuit 113 is not limited to the case of including the two inductors 1130 and 1131, and may include the two inductors 1130 and 1131 and a capacitor, for example. Further, when the power amplifier 111 is a differential composite amplifier, the output matching circuit 113 may include a transformer.

The controller 115 is mounted on the second main surface 92 of the mounting substrate 9 as illustrated in FIG. 2. In plan view in the thickness direction D1 of the mounting substrate 9, the outer peripheral shape of the controller 115 is a quadrangle. The controller 115 is an IC chip including a substrate having a first main surface and a second main surface opposite to each other and a circuit portion formed on the substrate on a side of the first main surface, for example. The substrate is a silicon substrate, for example. The circuit portion includes a control circuit that controls the power amplifier 111 in accordance with a control signal from the signal processing circuit 301.

Each of the two reception filters 171 and 172 is a ladder filter, for example, and includes multiple (four, for example) series arm resonators and multiple (three, for example) parallel arm resonators. Each of the two reception filters 171 and 172 is an acoustic wave filter, for example. In the acoustic wave filter, each of the multiple series arm resonators and the multiple parallel arm resonators is constituted of an acoustic wave resonator. The acoustic wave filter is a surface acoustic wave filter using a surface acoustic wave, for example. In the surface acoustic wave filter, each of the multiple series arm resonators and the multiple parallel arm resonators is a SAW resonator, for example.

The two reception filters 171 and 172 are mounted on the first main surface 91 of the mounting substrate 9 as illustrated in FIG. 1. In plan view in the thickness direction D1 of the mounting substrate 9, the outer peripheral shape of each of the two reception filters 171 and 172 is a quadrangle. The reception filter 171 constituting the electronic component 2 includes a substrate 201 and a circuit portion 2014 as illustrated in FIG. 3, for example. The substrate 201 has a first main surface 2011 and a second main surface 2012 opposite to each other in a thickness direction of the substrate 201. The circuit portion 2014 includes multiple IDT electrodes 2015 formed on the first main surface 2011 of the substrate 201. Further, the reception filter 171 includes a spacer layer 2017, a cover member 2018, and multiple outer electrodes 25 as constituent elements of a package structure. The reception filter 171 has a rectangular shape in plan view in the thickness direction D1 of the mounting substrate 9, but is not limited thereto, and may have a square shape, for example. In the reception filter 171, the substrate 201 is a piezoelectric substrate, and is a lithium tantalate substrate or a lithium niobate substrate, for example.

The spacer layer 2017 is provided on the substrate 201 on a side of the first main surface 2011. The spacer layer 2017 surrounds the multiple IDT electrodes 2015 in plan view in the thickness direction of the substrate 201. In plan view in the thickness direction of the substrate 201, the spacer layer 2017 has a rectangular frame shape. The spacer layer 2017 has an electrical insulation property. A material of the spacer layer 2017 is epoxy resin, polyimide, or the like. The cover member 2018 has a flat plate shape. The cover member 2018 is disposed on the spacer layer 2017 to face the substrate 201 in the thickness direction of the substrate 201. The cover member 2018 overlaps with the multiple IDT electrodes 2015 in the thickness direction of the substrate 201, and is separated from the multiple IDT electrodes 2015 in the thickness direction of the substrate 201. The cover member 2018 has an electrical insulation property. A material of the cover member 2018 is epoxy resin, polyimide, or the like. The reception filter 171 has a space S2 surrounded by the substrate 201, the spacer layer 2017, and the cover member 2018. The space S2 contains a gas. The gas is air, an inert gas (nitrogen gas, for example), or the like. The multiple outer electrodes 25 are exposed from the cover member 2018.

A structure of the second reception filter 172 is the same as a structure of the first reception filter 171.

The low-noise amplifier 121 is mounted on the second main surface 92 of the mounting substrate 9 as illustrated in FIG. 2. In plan view in the thickness direction D1 of the mounting substrate 9, the outer peripheral shape of the low-noise amplifier 121 is a quadrangle. The low-noise amplifier 121 is an IC chip including a substrate having a first main surface and a second main surface opposite to each other and a circuit portion formed on the substrate on a side of the first main surface, for example. The substrate is a silicon substrate, for example. The circuit portion includes an FET as an amplification transistor that amplifies a reception signal inputted to an input terminal of the low-noise amplifier 121. The amplification transistor is not limited to an FET, and may be a bipolar transistor, for example. The low-noise amplifier 121 is flip-chip mounted on the second main surface 92 of the mounting substrate 9 such that the first main surface among the first main surface and the second main surface of the substrate faces the second main surface 92 of the mounting substrate 9.

The two inductors 1230 and 1231 included in the input matching circuit 123 are mounted on the first main surface 91 of the mounting substrate 9 as illustrated in FIG. 1. In plan view in the thickness direction D1 of the mounting substrate 9, the outer peripheral shape of each of the two inductors 1230 and 1231 is a quadrangle. Each of the two inductors 1230 and 1231 is a chip inductor. The input matching circuit 123 is not limited to the case of including only the two inductors 1230 and 1231, and may include the two inductors 1230 and 1231, and one or multiple capacitors, for example.

The first switch 104, the second switch 105, and the third switch 106 are mounted on the second main surface 92 of the mounting substrate 9. In plan view in the thickness direction D1 of the mounting substrate 9, the outer peripheral shape of each of the first switch 104, the second switch 105, and the third switch 106 is a quadrangle. Each of the first switch 104, the second switch 105, and the third switch 106 is an IC chip including a substrate having a first main surface and a second main surface opposite to each other and a circuit portion formed on the substrate on a side of the first main surface, for example. The substrate is a silicon substrate, for example. The circuit portion includes multiple FETs as multiple switching elements. Each of the multiple switching elements is not limited to an FET, and may be a bipolar transistor, for example. Each of the first switch 104, the second switch 105, and the third switch 106 is flip-chip mounted on the second main surface 92 of the mounting substrate 9 such that the first main surface among the first main surface and the second main surface of the substrate faces the second main surface 92 of the mounting substrate 9. In the radio frequency module 100, two or three of the first switch 104, the second switch 105, and the third switch 106 may be included in one IC chip.

The multiple outer connection terminals 8 are disposed on the second main surface 92 of the mounting substrate 9 as illustrated in FIG. 2. "The outer connection terminal 8 is disposed on the second main surface 92 of the mounting substrate 9" includes a case that the outer connection terminal 8 is mechanically connected to the second main surface 92 of the mounting substrate 9 and a case that the outer connection terminal 8 is electrically connected to (an appropriate conductive portion of) the mounting substrate 9. The material of the multiple outer connection terminals 8 is metal (copper, copper alloy, or the like, for example), for example. Each of the multiple outer connection terminals 8 is a columnar electrode. The columnar electrode is a cylindrical electrode, for example. The multiple outer connection terminals 8 are bonded to the conductive portion of the mounting substrate 9 by solder, for example, but are not limited thereto. For example, the outer connection terminals 8 may be bonded using a conductive adhesive (conductive paste, for example) or may be directly bonded.

The multiple outer connection terminals 8 include the antenna terminal 81, the signal input terminal 82, the signal output terminal 83, the control terminal 84, and the multiple ground terminals 85. The multiple ground terminals 85 are electrically connected to the ground layer of the mounting substrate 9. The ground layer is a circuit ground of the radio frequency module 100, and the multiple circuit components of the radio frequency module 100 include a circuit component electrically connected to the ground layer.

The resin layer 5 (hereinafter also referred to as first resin layer 5) is disposed on the first main surface 91 of the mounting substrate 9 as illustrated in FIG. 2. The first resin layer 5 covers the outer peripheral surface of each of the first group circuit components, mounted on the first main surface 91 of the mounting substrate 9, among the multiple circuit components. Here, the first resin layer 5 covers the outer peripheral surface 13 of the filter 1 (transmission filter 131), the outer peripheral surface 23 of the electronic component 2 (reception filter 171), an outer peripheral surface 1113 of the power amplifier 111, an outer peripheral surface of the inductor 1130, an outer peripheral surface of the inductor 1131, an outer peripheral surface of the inductor 1230, and an outer peripheral surface of the inductor 1231. The first resin layer 5 includes resin (epoxy resin, for example). The first resin layer 5 may contain filler in addition to resin.

Further, the radio frequency module 100 further includes a second resin layer 19 disposed on the second main surface 92 of the mounting substrate 9. The second resin layer 19 covers the second group circuit components mounted on the second main surface 92 of the mounting substrate 9 and the outer peripheral surfaces of the multiple outer connection terminals 8. The second resin layer 19 includes resin (epoxy resin, for example). The second resin layer 19 may contain filler in addition to resin. A material of the second resin layer 19 may be the same as a material of the first resin layer 5, or may be different from the material of the first resin layer 5.

The conductive layer 6 covers the first resin layer 5. The conductive layer 6 has conductivity. In the radio frequency module 100, the conductive layer 6 is provided for the purpose of the electromagnetic shielding between the inside and outside of the radio frequency module 100. The conductive layer 6 has a multilayer structure in which multiple metal layers are laminated, but is not limited thereto, and may have a single metal layer. The metal layer includes one or multiple types of metal. The conductive layer 6 covers the main surface 51 of the first resin layer 5 on the side opposite to the mounting substrate 9, an outer peripheral surface 53 of the first resin layer 5, and an outer peripheral surface 93 of the mounting substrate 9. Further, the conductive layer 6 covers an outer peripheral surface 193 of the second resin layer 19, as well. The conductive layer 6 is in contact with at least part of an outer peripheral surface of the ground layer of the mounting substrate 9. With this, the electric potential of the conductive layer 6 may be made equal to the electric potential of the ground layer.

The conductive layer 6 covers the main surface 11 of the filter 1 on the side of the mounting substrate 9 and the main surface 21 of the electronic component 2 on the side of the mounting substrate 9. The conductive layer 6 is in contact with the main surface 11 of the filter 1 on the side of the mounting substrate 9 and the main surface 21 of the electronic component 2 on the side of the mounting substrate 9.

(1.3) Detailed Structure of Radio Frequency Module

In the radio frequency module 100 according to Embodiment 1, the first main surface 91 of the mounting substrate 9 has the recess 911. The mounting substrate 9 is the multilayer substrate described above and includes multiple dielectric layers. The multiple dielectric layers include multiple (four, for example) first dielectric layers 97 and multiple (three, for example) second dielectric layers 98 as illustrated in FIG. 3, for example. A material of the multiple first dielectric layers 97 is the same as a material of the multiple second dielectric layers 98. Further, a thickness of each of the multiple first dielectric layers 97 is the same as a thickness of each of the multiple second dielectric layers 98. The multiple first dielectric layers 97 are positioned on a side of the first main surface 91 among the first main surface 91 and the second main surface 92 in the thickness direction D1 of the mounting substrate 9. The multiple second dielectric layers 98 are positioned on a side of the second main surface 92 among the first main surface 91 and the second main surface 92 in the thickness direction D1 of the mounting substrate 9. The recess 911 is formed across the multiple first dielectric layers 97 in the thickness direction D1 of the mounting substrate 9. A depth Dp1 of the recess 911 is greater than the half of the maximum thickness of the mounting substrate 9, for example. Further, the number of the first dielectric layers 97 and the number of the second dielectric layers 98 in the mounting substrate 9 are not limited to four and three, respectively, and may be five or more and four or more, respectively. In the mounting substrate 9, when the depth Dp1 of the recess 911 is the half of the maximum thickness or less of the mounting substrate 9, the number of the first dielectric layers 97 and the number of the second dielectric layers 98 may be the same, or the number of the first dielectric layers 97 may be less than the number of the second dielectric layers 98.

In the radio frequency module 100, the main surface 11 of the filter 1 and the main surface 21 of the electronic component 2 are in contact with the conductive layer 6.

Hereinafter, for convenience of description, a plane perpendicular to the thickness direction D1 of the mounting substrate 9 and including at least part of the first main surface 91 is defined as a reference plane RP1 as illustrated in FIG. 2. The reference plane RP1 does not include the bottom surface 9111 of the recess 911 in the first main surface 91 of the mounting substrate 9, but includes at least part of a peripheral portion of the first main surface 91 of the mounting substrate 9. In the radio frequency module 100, the filter 1 is mounted on the first main surface 91 of the mounting substrate 9 such that the thickness direction of the filter 1 is aligned with the thickness direction D1 of the mounting substrate 9. The electronic component 2 is mounted on the first main surface 91 of the mounting substrate 9 such that the thickness direction of the electronic component 2 is aligned with the thickness direction D1 of the mounting substrate 9. Each of the main surface 11 of the filter 1 and the main surface 21 of the electronic component 2 is substantially parallel to the reference plane RP1. In the radio frequency module 100, a first distance between the reference plane RP1 and the main surface 11 of the filter 1 in the thickness direction D1 of the mounting substrate 9 is the same as a second distance between the reference plane RP1 and the main surface 21 of the electronic component 2 in the thickness direction D1 of the mounting substrate 9. The first distance and the second distance being the same is not limited to being exactly the same, and it is sufficient that the second distance is within a range of the first distance ±15%. It is more preferable that the second distance be within a range of the first distance ±10%, and still more preferable that the second distance be within a range of the first distance ±5%.

In the radio frequency module 100, each of the main surface 11 of the filter 1 and the main surface 21 of the electronic component 2 is a rough surface. In other words, in the radio frequency module 100, a fine irregularity is formed on each of the main surface 11 of the filter 1 and the main surface 21 of the electronic component 2. The main surface 11 of the filter 1 may be rougher than the outer peripheral surface 13 of the filter 1. The main surface 21 of the electronic component 2 may be rougher than the outer peripheral surface 23 of the electronic component 2.

In the radio frequency module 100, the filter 1 (transmission filter 131), the electronic component 2 (reception filter 171), and the power amplifier 111 are mounted on the first main surface 91 of the mounting substrate 9. In the radio frequency module 100, when the reference plane RP1 described above is used as a height reference, the power amplifier 111 is lower than the filter 1 and the electronic component 2 in height. In other words, a third distance between the reference plane RP1 and the main surface 1111 of the power amplifier 111 in the thickness direction D1 of the mounting substrate 9 is shorter than both the first distance and the second distance. The resin layer 5 covers the main surface 1111 of the power amplifier 111. In the radio frequency module 100, the maximum height roughness (Rz) of each of the main surface 11 of the filter 1 and the main surface 21 of the electronic component 2 is larger than the maximum height roughness of the main surface 1111 of the power amplifier 111. The maximum height roughness of each of the main surface 11 of the filter 1, the main surface 21 of the electronic component 2, and the main surface 1111 of the power amplifier 111 is a value measured on a scanning transmission electron microscope (STEM) image, obtained by observing a section of the radio frequency module 100 under the STEM. The maximum height roughness is a sum of a maximum value of a peak height and a maximum value of a valley depth in the STEM image in each of the main surface 11 of the filter 1, the main surface 21 of the electronic component 2, and the main surface 1111 of the power amplifier 111. That is, the maximum height roughness is a peak-to-valley value of the irregularity on each of the main surface 11 of the filter 1, the main surface 21 of the electronic component 2, and the main surface 1111 of the power amplifier 111. The surface roughness of each of the main surface 11 of the filter 1 and the main surface 21 of the electronic component 2 may be altered by a condition of a process of roughening the filter 1 and the electronic component 2 by grinding or the like at the time of manufacturing, for example. In discussing the relative magnitude relationship in the maximum height roughness, the maximum height roughness is not limited to a value measured on a STEM image, and may be a value measured on a scanning electron microscope (SEM) image, for example.

In the radio frequency module 100, the transmission filter 132 and the reception filter 172 are in contact with the conductive layer 6 the same as the filter 1 (transmission filter 131) and the electronic component 2 (reception filter 171).

Further, in the radio frequency module 100, a fourth distance and the first distance in the thickness direction D1 of the mounting substrate 9 are the same. The fourth distance is a distance between the reference plane RP1 and the main surface of the transmission filter 132 on the side opposite to the mounting substrate 9. The fourth distance and the first distance being the same is not limited to being exactly the same, and it is sufficient that the fourth distance is within a range of the first distance ±15%. It is more preferable that the fourth distance be within a range of the first distance ±10%, and still more preferable that the fourth distance be within a range of the first distance ±5%.

Further, in the radio frequency module 100, a fifth distance and the first distance in the thickness direction D1 of the mounting substrate 9 are the same. The fifth distance is a distance between the reference plane RP1 and a main surface of the reception filter 172 on the side opposite to the mounting substrate 9. The fifth distance and the first distance being the same is not limited to being exactly the same, and it is sufficient that the fifth distance is within a range of the first distance ±15%. It is more preferable that the fifth distance be within a range of the first distance ±10%, and still more preferable that the fifth distance be within a range of the first distance ±5%.

Further, in the radio frequency module 100, the first distance is the same as a sixth distance between the reference plane RP1 and the main surface 51 of the resin layer 5 in the thickness direction D1 of the mounting substrate 9. The sixth distance and the first distance being the same is not limited to being exactly the same, and it is sufficient that the sixth distance is within a range of the first distance ±15%. It is more preferable that the sixth distance be within a range of the first distance ±10%, and still more preferable that the sixth distance be within a range of the first distance ±5%.

In the radio frequency module 100, each of the two inductors 1130 and 1131 included in the output matching circuit 113 is not in contact with the conductive layer 6. Accordingly, two outer electrodes of each of the two inductors 1130 and 1131 are not in contact with the conductive layer 6. A main surface of each of the two inductors 1130 and 1131 on the side opposite to the mounting substrate 9 is covered by the resin layer 5.

In the radio frequency module 100, each of the two inductors 1230 and 1231 included in the input matching circuit 123 is not in contact with the conductive layer 6. Accordingly, two outer electrodes of each of the two inductors 1230 and 1231 are not in contact with the conductive layer 6. A main surface of each of the two inductors 1230 and 1231 on the side opposite to the mounting substrate 9 is covered by the resin layer 5.

The conductive layer 6 has a multilayer structure in which multiple metal layers are laminated, but is not limited thereto, and may have a single metal layer. The metal layer includes one or multiple types of metal.

In the radio frequency module 100, the main surface 11 of the filter 1, the main surface 21 of the electronic component 2, and the main surface 51 of the resin layer 5 are substantially flush with each other.

In the radio frequency module 100, the materials of the portions in contact with the conductive layer 6, of the filter 1 and the electronic component 2, are the same. The material of each portion in contact with the conductive layer 6, of the filter 1 and the electronic component 2, is lithium tantalate or lithium niobate. In the radio frequency module 100, a material of each portion in contact with the conductive layer 6, of the transmission filter 132 and the reception filter 172, is the same as the material of each portion in contact with the conductive layer 6, of the filter 1 and the electronic component 2. The materials of the portions in contact with the conductive layer 6, of the filter 1 and the electronic component 2, are not limited to being the same, and may be different from each other.

In the radio frequency module 100 according to Embodiment 1, it is preferable that the conductive layer 6 be in contact with the main surface of each of the multiple transmission filters 131 and 132 over the entire area on the side opposite to the mounting substrate 9, from the viewpoint of improving a heat dissipation property.

In the radio frequency module 100, at least part of the filter 1 is positioned inside the recess 911. In the radio frequency module 100, the filter 1 includes the multiple outer electrodes 15 connected to the first main surface 91 of the mounting substrate 9. In the radio frequency module 100, all the outer electrodes 15 of the multiple outer electrodes 15 are positioned inside the recess 911. Each of the multiple outer electrodes 15 is a bump. The thickness of the outer electrode 15 in the thickness direction D1 of the mounting substrate 9 is greater than the depth Dp1 of the recess 911, but are not limited thereto, and may be the same as the depth Dp1 of the recess 911 or less.

In the radio frequency module 100, the entirety of the filter 1 overlaps with the recess 911 in plan view in the thickness direction D1 of the mounting substrate 9. "The entirety of the filter 1 overlaps with the recess 911 in plan view in the thickness direction D1 of the mounting substrate 9" means a case that the filter 1 is positioned within a region of the recess 911 in plan view in the thickness direction D1 of the mounting substrate 9. In the radio frequency module 100, the entirety of the filter 1 overlaps with part of the recess 911 in plan view in the thickness direction D1 of the mounting substrate 9. In the radio frequency module 100, an external size of the filter 1 is smaller than a size of the bottom surface 9111 of the recess 911 in plan view in the thickness direction D1 of the mounting substrate 9.

In the radio frequency module 100, a portion 54 (see FIG. 3) of the resin layer 5 is positioned inside the recess 911. The portion 54 of the resin layer 5 also covers part of an outer periphery of each of the multiple outer electrodes 15 of the filter 1. The portion 54 of the resin layer 5 includes a portion 551 of an underfill portion 55 (see FIG. 3) between the filter 1 and the bottom surface 9111 of the recess 911 in the first main surface 91 of the mounting substrate 9.

In the radio frequency module 100, the filter 1 is the transmission filter 131, and the electronic component 2 is the reception filter 171. In the radio frequency module 100, the main surface 21 of the electronic component 2 on the side opposite to the mounting substrate 9 is in contact with the conductive layer 6. In the radio frequency module 100, at least part of the electronic component 2 is positioned inside the recess 911. In the radio frequency module 100, the electronic component 2 includes multiple outer electrodes 25 connected to the first main surface 91 of the mounting substrate 9. In the radio frequency module 100, all the outer electrodes 25 of the multiple outer electrodes 25 are positioned inside the recess 911. Each of the multiple outer electrodes 25 is a bump. The thickness of the outer electrode 25 in the thickness direction D1 of the mounting substrate 9 is greater than the depth Dp1 of the recess 911, but are not limited thereto, and may be the same as the depth Dp1 of the recess 911 or less.

In the radio frequency module 100, the entirety of the electronic component 2 overlaps with the recess 911 in plan view in the thickness direction D1 of the mounting substrate 9. In the radio frequency module 100, the entirety of the electronic component 2 overlaps with part of the recess 911 in plan view in the thickness direction D1 of the mounting substrate 9. In the radio frequency module 100, an external size of the electronic component 2 is smaller than the size of the bottom surface 9111 of the recess 911 in plan view in the thickness direction D1 of the mounting substrate 9.

In the radio frequency module 100, as described above, the portion 54 of the resin layer 5 is positioned inside the recess 911. The portion 54 of the resin layer 5 covers also an outer periphery of each of the multiple outer electrodes 25 of the electronic component 2. The portion 54 of the resin layer 5 includes a portion 561 of an underfill portion 56 between the electronic component 2 and the bottom surface 9111 of the recess 911 in the first main surface 91 of the mounting substrate 9.

In the radio frequency module 100, part of the transmission filter 132 is positioned inside the recess 911 the same as the filter 1. In the radio frequency module 100, the entirety of the transmission filter 132 overlaps with the recess 911 in plan view in the thickness direction D1 of the mounting substrate 9 as illustrated in FIG. 1. In the radio frequency module 100, the entirety of the transmission filter 132 overlaps with part of the recess 911 in plan view in the thickness direction D1 of the mounting substrate 9.

Further, in the radio frequency module 100, part of the reception filter 172 is positioned inside the recess 911 the same as the reception filter 172. In the radio frequency module 100, the entirety of the reception filter 172 overlaps with the recess 911 in plan view in the thickness direction D1 of the mounting substrate 9 as illustrated in FIG. 1. In the radio frequency module 100, the entirety of the reception filter 172 overlaps with part of the recess 911 in plan view in the thickness direction D1 of the mounting substrate 9.

In the radio frequency module 100, the two transmission filters 131 and 132 and the two reception filters 171 and 172 overlap with the recess 911 in plan view in the thickness direction D1 of the mounting substrate 9, and the two transmission filters 131 and 132 and the two reception filters 171 and 172 are separated from each other.

In the radio frequency module 100, the main surface 1111 of the power amplifier 111 on the side opposite to the mounting substrate 9 is not in contact with the conductive layer 6. The power amplifier 111 is not positioned inside the recess 911. The power amplifier 111 does not overlap with the recess 911 in plan view in the thickness direction D1 of the mounting substrate 9.

In the radio frequency module 100, each of the two inductors 1230 and 1231 is a surface-mount inductor having multiple outer electrodes, and is surface-mounted on the mounting substrate 9. The surface-mounting is achieved by bonding the multiple outer electrodes to the mounting substrate 9 with bonding portions 39 (see FIG. 2) corresponding to the multiple outer electrodes on a one-to-one basis. The material of the bonding portion 39 is solder, for example.

(1.4) Layout of Circuit Components in Radio Frequency Module

In the radio frequency module 100, the first reception filter 171 and the second reception filter 172 are disposed in a direction parallel to a direction in which the first transmission filter 131 and the second transmission filter 132 are disposed in plan view in the thickness direction D1 of the mounting substrate 9. The first reception filter 171 and the second reception filter 172 are disposed in this order along a direction from the first transmission filter 131 toward the second transmission filter 132.

In plan view in the thickness direction D1 of the mounting substrate 9, the inductor 1230 of the input matching circuit 123 is adjacent to the reception filter 171. "The inductor 1230 is adjacent to the reception filter 171" means a case that, in plan view in the thickness direction D1 of the mounting substrate 9, no other circuit component is present between the inductor 1230 and the reception filter 171, and the inductor 1230 and the reception filter 171 are disposed side by side. In the radio frequency module 100, the reception filter 171 is positioned between the transmission filter 131 and the inductor 1230 in plan view in the thickness direction D1 of the mounting substrate 9.

In plan view in the thickness direction D1 of the mounting substrate 9, the inductor 1231 of the input matching circuit 123 is adjacent to the reception filter 172. "The inductor 1231 is adjacent to the reception filter 172" means a case that, in plan view in the thickness direction D1 of the mounting substrate 9, no other circuit component is present between the inductor 1231 and the reception filter 172, and the inductor 1231 and the reception filter 172 are disposed side by side. In the radio frequency module 100, the reception filter 172 is positioned between the transmission filter 132 and the inductor 1231 in plan view in the thickness direction D1 of the mounting substrate 9.

In the radio frequency module 100, the reception filter 171 (electronic component 2) and the low-noise amplifier 121 overlap with each other in plan view in the thickness direction D1 of the mounting substrate 9. In the radio frequency module 100, part of the reception filter 171 overlaps with part of the low-noise amplifier 121 in plan view in the thickness direction D1 of the mounting substrate 9. However, the present disclosure is not limited thereto, and the entirety of the reception filter 171 may overlap with the entirety of the low-noise amplifier 121. Further, the entirety of the reception filter 171 may overlap with part of the low-noise amplifier 121, or the entirety of the low-noise amplifier 121 may overlap with part of the reception filter 171.

In the radio frequency module 100, the power amplifier 111 does not overlap with the low-noise amplifier 121 in plan view in the thickness direction D1 of the mounting substrate 9.

(1.5) Manufacturing Method of Radio Frequency Module

As a method for manufacturing the radio frequency module 100, a manufacturing method including a first step, a second step, a third step, a fourth step, and a fifth step may be employed, for example. The first step is a step of mounting multiple circuit components on the mounting substrate 9 and disposing multiple outer connection terminals 8. The second step is a step of forming a first resin material layer that covers the first group circuit components and the like and is a base of the first resin layer 5 on the side of the first main surface 91 of the mounting substrate 9. The second step is also a step of forming a second resin material layer that is a base of the second resin layer 19 on the side of the second main surface 92 of the mounting substrate 9.

In the third step, the first resin material layer is ground from the main surface of the first resin material layer on the side opposite to the mounting substrate 9, and further, the first resin material layer, the filter 1 (transmission filter 131), the electronic component 2 (reception filter 172), the transmission filter 132, and the reception filter 172 are ground to form the first resin layer 5. At the same time, each of the filter 1, the electronic component 2, the transmission filter 132, and the reception filter 172 is made thinner. In the third step, the filter 1, the electronic component 2, the transmission filter 132, and the reception filter 172 are ground to roughen (make unsmoothed) the main surface 11 of the filter 1, the main surface 21 of the electronic component 2, the main surface of the transmission filter 132, and the main surface of the reception filter 172. In the fourth step, the second resin material layer is ground from the main surface of the second resin material layer on the side opposite to the mounting substrate 9 to expose the tips of the multiple outer connection terminals 8, and then the second resin material layer and the outer connection terminals 8 are ground to form the second resin layer 19. The fifth step is a step of forming the conductive layer 6 by a sputtering method, a vapor deposition method, or a printing method, for example.

(2) Effect (2.1) Radio Frequency Module

The radio frequency module 100 according to Embodiment 1 includes the mounting substrate 9, the filter 1, and the conductive member 3 (conductive layer 6). The mounting substrate 9 has the first main surface 91 and the second main surface 92 opposite to each other. The filter 1 is mounted on the first main surface 91 of the mounting substrate 9. The conductive member 3 covers at least part of the main surface 11 of the filter 1 on the side opposite to the mounting substrate 9. The first main surface 91 of the mounting substrate 9 has the recess 911. The main surface 11 of the filter 1 is in contact with the conductive member 3. At least part of the filter 1 is positioned inside the recess 911.

The radio frequency module 100 according to Embodiment 1 may be reduced in height in the thickness direction D1 of the mounting substrate 9. Here, it is possible to reduce the radio frequency module 100 in height while maintaining an effect of suppressing a temperature rise of the filter 1. The effect is exhibited since the main surface 11 of the filter 1 is in contact with the conductive member 3. It is possible to stabilize the characteristics of the radio frequency module 100 since the temperature rise of the filter 1 is suppressed.

Further, in the radio frequency module 100, each of the main surface 11 of the filter 1 and the main surface 21 of the electronic component 2 has a rough surface. With this, in the radio frequency module 100, it is possible to improve the adhesion of the main surface 11 of the filter 1 and the conductive layer 6, and the adhesion of the main surface 21 of the electronic component 2 and the conductive layer 6.

Further, in the radio frequency module 100, the reception filter 171 (electronic component 2), the recess 911 of the first main surface 91 of the mounting substrate 9, and the low-noise amplifier 121 overlap with each other in plan view in the thickness direction D1 of the mounting substrate 9. With this, in the radio frequency module 100, a length of a wiring line between the reception filter 171 and the low-noise amplifier 121 may be shortened. With this, in the radio frequency module 100, the stray capacitance due to the wiring line between the reception filter 171 and the low-noise amplifier 121 may be reduced, and at least one of the filter characteristic of the reception filter 171 and the noise figure (NF) of the low-noise amplifier 121 may be improved.

(2.2) Communication Device

The communication device 300 according to Embodiment 1 includes the signal processing circuit 301 and the radio frequency module 100. The signal processing circuit 301 is connected to the radio frequency module 100.

Since the communication device 300 according to Embodiment 1 includes the radio frequency module 100, the communication device 300 may be reduced in height.

Multiple electronic components constituting the signal processing circuit 301 may be mounted on the circuit substrate described above, for example, or may be mounted on a circuit substrate (second circuit substrate) other than a circuit substrate (first circuit substrate) on which the radio frequency module 100 is mounted.

(3) Modification of Radio Frequency Module (3.1) Modification 1

Figure 5:
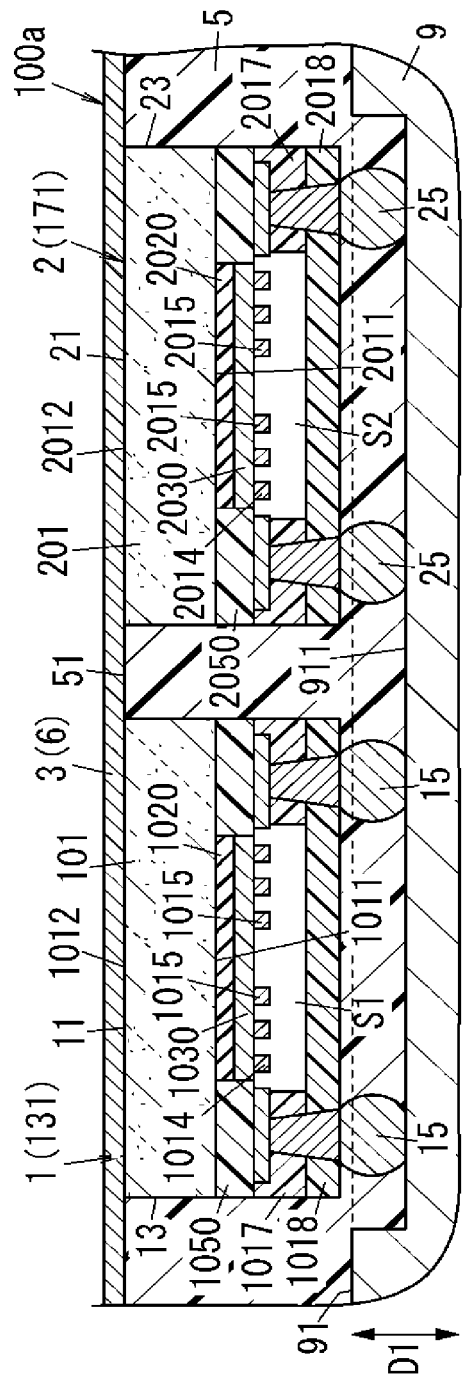
FIG. 5 is a partially enlarged sectional view of a radio frequency module according to Modification 1 of Embodiment 1.

A radio frequency module 100a according to Modification 1 of Embodiment 1 will be described with reference to FIG. 5. With respect to the radio frequency module 100a according to Modification 1, the same constituent elements as those of the radio frequency module 100 according to Embodiment 1 are denoted by the same symbols, and a description thereof is omitted.

Each of the structures of the filter 1 (transmission filter 131) and the electronic component 2 (reception filter 171) in the radio frequency module 100a according to Modification 1 is different from each of the structures of the filter 1 (transmission filter 131) and the electronic component 2 (reception filter 171) in the radio frequency module 100 according to Embodiment 1.

The substrate 101 of the transmission filter 131 in the radio frequency module 100a is a silicon substrate, and the transmission filter 131 in the radio frequency module 100a includes a low acoustic velocity film 1020 provided on the first main surface 1011 of the substrate 101, and a piezoelectric layer 1030 provided on the low acoustic velocity film 1020. In the transmission filter 131, a piezoelectric substrate is constituted of the substrate 101, the low acoustic velocity film 1020, and the piezoelectric layer 1030. In the transmission filter 131, a circuit portion 1014 including the multiple IDT electrodes 1015 is formed on the piezoelectric layer 1030.

The low acoustic velocity film 1020 is positioned apart from an outer periphery of the substrate 101 in plan view in the thickness direction of the substrate 101. The transmission filter 131 further includes an insulation layer 1050 that covers a region of the first main surface 1011 of the substrate 101 not covered by the low acoustic velocity film 1020. The insulation layer 1050 has an electrical insulation property. The insulation layer 1050 is formed along an outer edge of the substrate 101 on the first main surface 1011 of the substrate 101. The insulation layer 1050 surrounds the multiple IDT electrodes 1015. In plan view in the thickness direction of the substrate 101, the insulation layer 1050 has a frame shape (rectangular frame shape, for example). Part of the insulation layer 1050 overlaps with an outer peripheral portion of the piezoelectric layer 1030 in the thickness direction of the substrate 101. The outer peripheral surface of the piezoelectric layer 1030 and the outer peripheral surface of the low acoustic velocity film 1020 are covered by the insulation layer 1050. The material of the insulation layer 1050 is epoxy resin, polyimide, or the like.

The material of the piezoelectric layer 1030 is lithium niobate or lithium tantalate, for example. The low acoustic velocity film 1020 is a film in which an acoustic velocity of a bulk wave propagating through the low acoustic velocity film 1020 is lower than an acoustic velocity of a bulk wave propagating through the piezoelectric layer 1030. The material of the low acoustic velocity film 1020 is silicon oxide, for example, but is not limited to silicon oxide, and may be made of at least one type of material selected from the group of compounds obtained by adding fluorine, carbon or boron to tantalum oxide and silicon oxide. In the substrate 101, an acoustic velocity of a bulk wave propagating through the substrate 101 is higher than an acoustic velocity of an acoustic wave propagating through the piezoelectric layer 1030. Here, the bulk wave propagating through the substrate 101 is a bulk wave having the lowest acoustic velocity among multiple bulk waves propagating through the substrate 101.

The transmission filter 131 may further include a high acoustic velocity film provided between the substrate 101 and the low acoustic velocity film 1020. The high acoustic velocity film is a film in which an acoustic velocity of a bulk wave propagating through the high acoustic velocity film is higher than an acoustic velocity of an acoustic wave propagating through the piezoelectric layer 1030. The material of the high acoustic velocity film is silicon nitride, for example, but is not limited to silicon nitride, and may be at least one type of material selected from the group consisting of diamond-like carbon, aluminum nitride, silicon carbide, silicon nitride, silicon oxynitride, silicon, sapphire, lithium tantalate, lithium niobate, quartz, zirconia, cordierite, mullite, steatite, forsterite, magnesia, and diamond.

A thickness of the piezoelectric layer 1030 is approximately $3.5\lambda$ or less, for example, when $\lambda$ is the wavelength of an acoustic wave determined by the electrode finger period of the IDT electrode 1015. A thickness of the low acoustic velocity film 1020 is $2.0\lambda$ or less, for example.

The transmission filter 131 may include an adhesion layer interposed between the low acoustic velocity film 1020 and the piezoelectric layer 1030, for example. The adhesion layer is made of resin (epoxy resin, polyimide resin), for example. Further, the transmission filter 131 may include a dielectric film between the low acoustic velocity film 1020 and the piezoelectric layer 1030, on the piezoelectric layer 1030, or under the low acoustic velocity film 1020.

The substrate 201 of the reception filter 171 in the radio frequency module 100a is a silicon substrate, and the reception filter 171 in the radio frequency module 100a includes a low acoustic velocity film 2020 provided on the first main surface 2011 of the substrate 201, and a piezoelectric layer 2030 provided on the low acoustic velocity film 2020. In the reception filter 171, a piezoelectric substrate is constituted of the substrate 201, the low acoustic velocity film 2020, and the piezoelectric layer 2030. In the reception filter 171, a circuit portion 2014 including multiple IDT electrodes 2015 is formed on the piezoelectric layer 2030.

The low acoustic velocity film 2020 is positioned apart from an outer periphery of the substrate 201 in plan view in the thickness direction of the substrate 201. The reception filter 171 further includes an insulation layer 2050 that covers a region of the first main surface 2011 of the substrate 201 not covered by the low acoustic velocity film 2020. The insulation layer 2050 has an electrical insulation property. The insulation layer 2050 is formed along an outer edge of the substrate 201 on the first main surface 2011 of the substrate 201. The insulation layer 2050 surrounds the multiple IDT electrodes 2015. In plan view in the thickness direction of the substrate 201, the insulation layer 2050 has a frame shape (rectangular frame shape, for example). Part of the insulation layer 2050 overlaps with an outer peripheral portion of the piezoelectric layer 2030 in the thickness direction of the substrate 201. The outer peripheral surface of the piezoelectric layer 2030 and the outer peripheral surface of the low acoustic velocity film 2020 are covered by the insulation layer 2050. The material of the insulation layer 2050 is epoxy resin, polyimide, or the like.

The material of the piezoelectric layer 2030 is lithium niobate or lithium tantalate, for example. The low acoustic velocity film 2020 is a film in which an acoustic velocity of a bulk wave propagating through the low acoustic velocity film 2020 is lower than an acoustic velocity of a bulk wave propagating through the piezoelectric layer 2030. The material of the low acoustic velocity film 2020 is silicon oxide, for example, but is not limited to silicon oxide, and may be made of at least one type of material selected from the group of compounds obtained by adding fluorine, carbon or boron to tantalum oxide and silicon oxide.

The reception filter 171 may further include a high acoustic velocity film provided between the substrate 201 and the low acoustic velocity film 2020.

In the radio frequency module 100a according to Modification 1, the main surface 11 of the filter 1 is in contact with the conductive member 3 (conductive layer 6) the same as the radio frequency module 100 according to Embodiment 1. This makes it possible to suppress the temperature rise of the filter 1. Further, in the radio frequency module 100a according to Modification 1, part of the filter 1 is positioned inside the recess 911 the same as in the radio frequency module 100 according to Embodiment 1. This makes it possible to reduce the radio frequency module 100a in height.

(3.2) Modification 2

Figure 6:
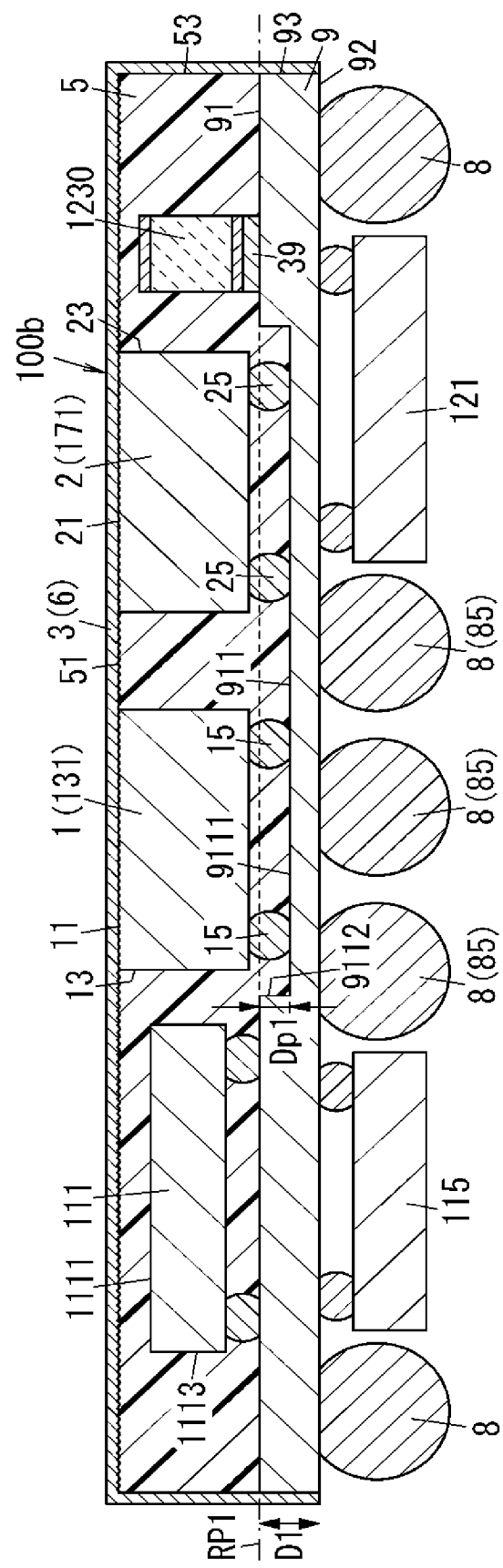
FIG. 6 is a sectional view of a radio frequency module according to Modification 2 of Embodiment 1.

A radio frequency module 100b according to Modification 2 of Embodiment 1 will be described with reference to FIG. 6. With respect to the radio frequency module 100b according to Modification 2, the same constituent elements as those of the radio frequency module 100 according to Embodiment 1 are denoted by the same symbols, and a description thereof is omitted.

The radio frequency module 100b according to Modification 2 is different from the radio frequency module 100 according to Embodiment 1 in that the multiple outer connection terminals 8 are ball bumps. Further, the radio frequency module 100b according to Modification 2 is different from the radio frequency module 100 according to Embodiment 1 in that the radio frequency module 100b does not include the second resin layer 19 (see FIG. 2) of the radio frequency module 100 according to Embodiment 1. The radio frequency module 100b according to Modification 2 may include an underfill portion provided in a space between the second main surface 92 of the mounting substrate 9 and the second group circuit components (controller 115 and low-noise amplifier 121, for example) mounted on the second main surface 92 of the mounting substrate 9.

The material of the ball bump constituting each of the multiple outer connection terminals 8 is gold, copper, solder, or the like, for example.

The multiple outer connection terminals 8 may include both the outer connection terminals 8 configured of ball bumps and the outer connection terminals 8 configured of columnar electrodes.

Embodiment 2

Figure 7:
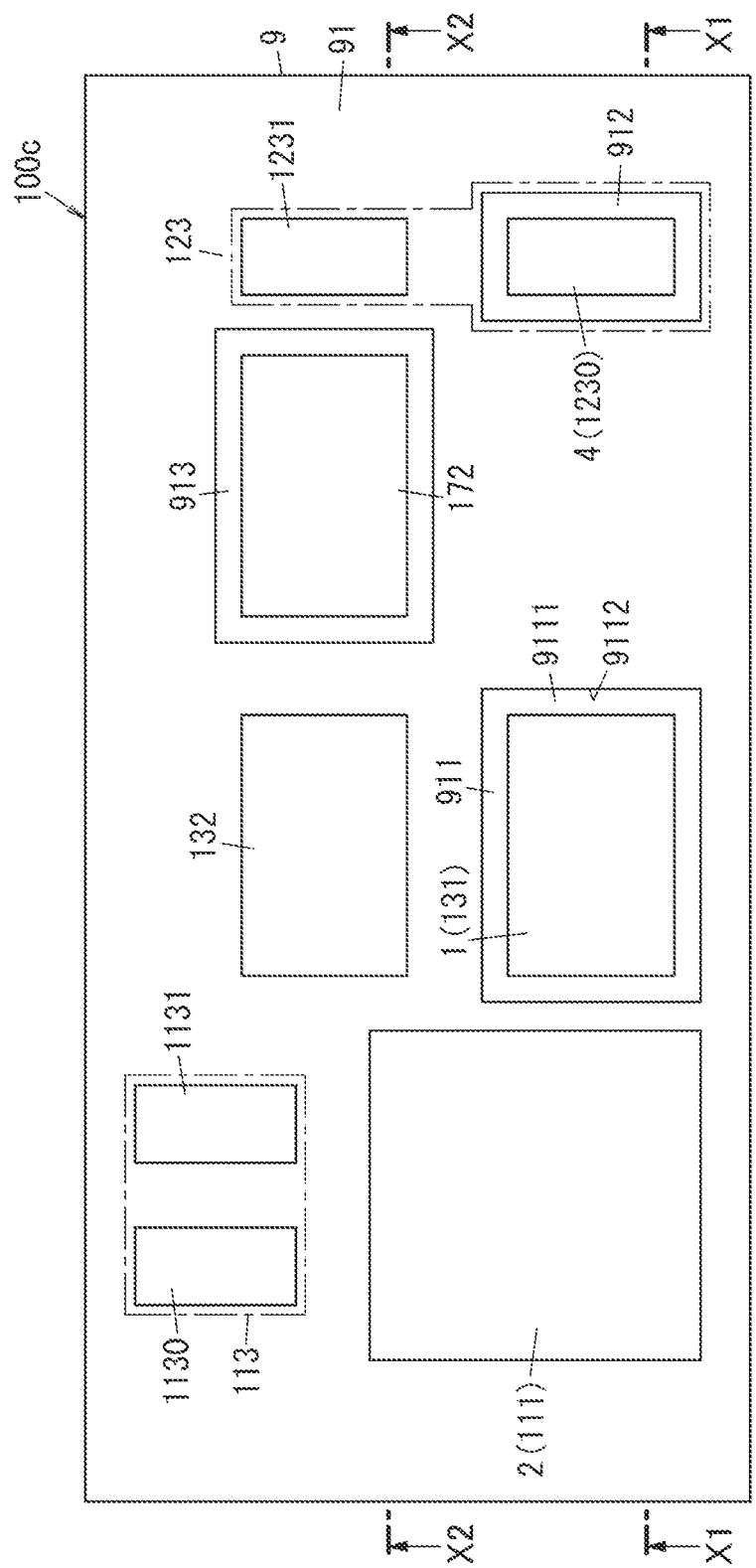
FIG. 7 is a plan view of a radio frequency module according to Embodiment 2.
Figure 8:
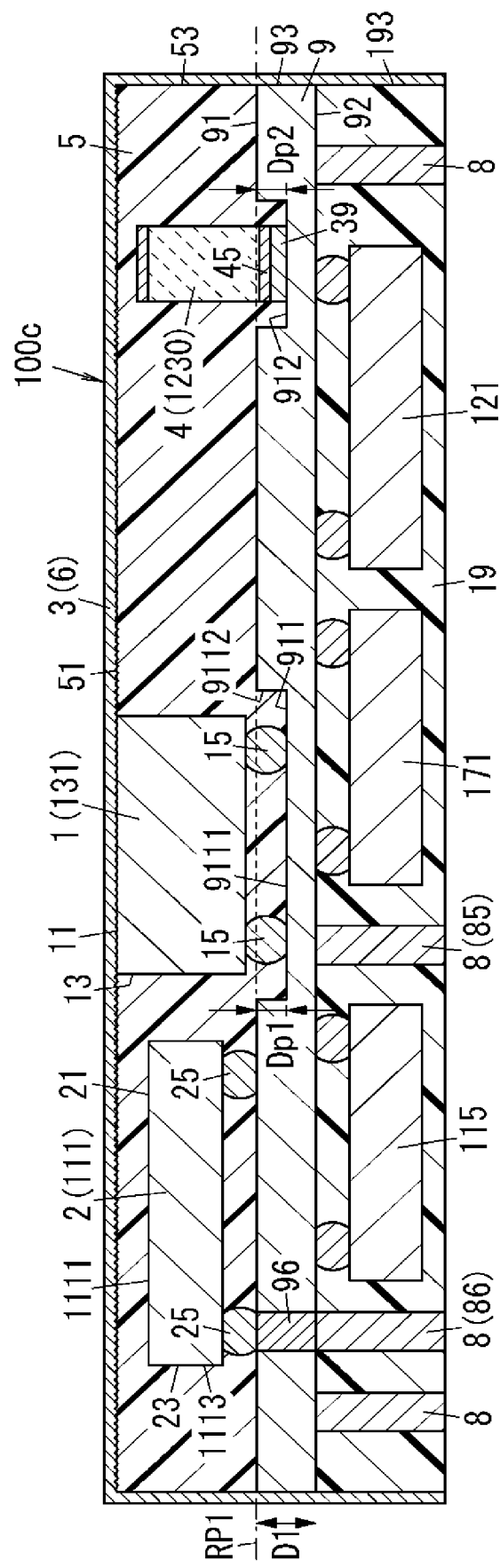
FIG. 8 is a sectional view of the radio frequency module according to Embodiment 2 taken along a line X1-X1 in FIG. 7.
Figure 9:
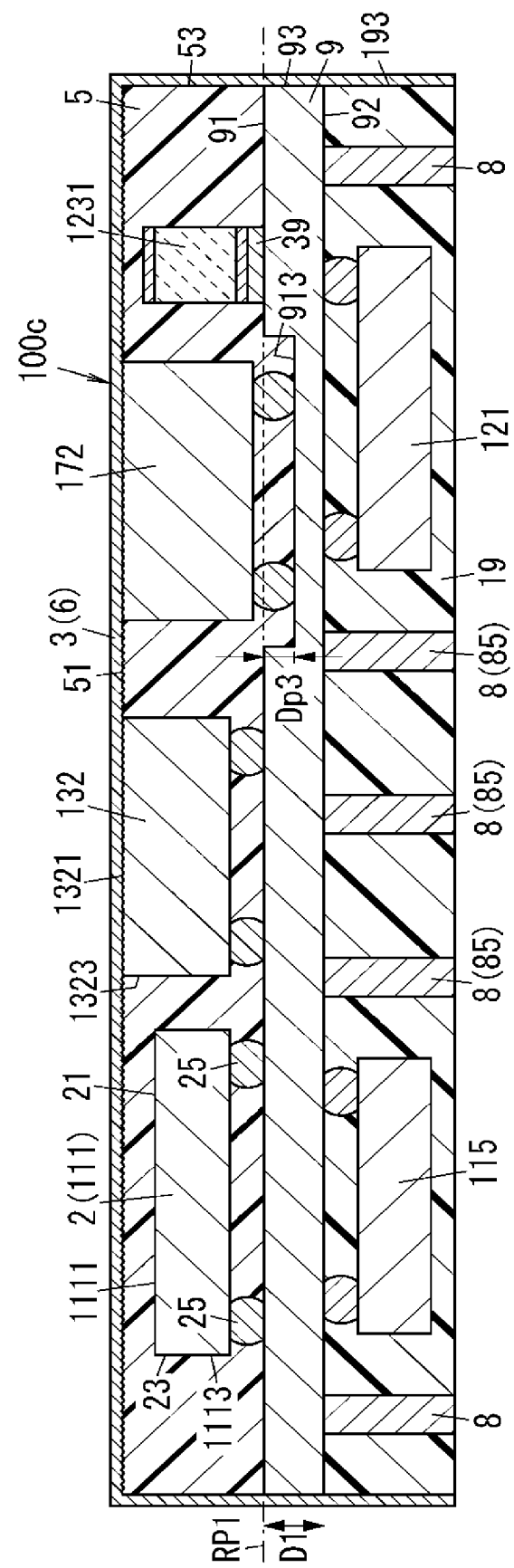
FIG. 9 is a sectional view of the radio frequency module according to Embodiment 2 taken along a line X2-X2 in FIG. 7.

A radio frequency module 100c according to Embodiment 2 will be described with reference to FIG. 7 to FIG. 9. With respect to the radio frequency module 100c according to Embodiment 2, the same constituent elements as those of the radio frequency module 100 according to Embodiment 1 are denoted by the same symbols, and a description thereof is omitted.

The radio frequency module 100c is different from the radio frequency module 100 according to Embodiment 1 in that the reception filter 171 is mounted on the second main surface 92 of the mounting substrate 9.

In the radio frequency module 100c, the transmission filter 131 is the filter 1 the same as in the radio frequency module 100 according to Embodiment 1. Further, in the radio frequency module 100c, the power amplifier 111 constitutes the electronic component 2. A thickness of the electronic component 2 is less than a thickness of the filter 1. In the radio frequency module 100c, the electronic component 2 is not in contact with the conductive layer 6 being the conductive member 3. The electronic component 2 does not overlap with the recess 911 in plan view in the thickness direction D1 of the mounting substrate 9. The main surface 21 of the electronic component 2 on the side opposite to the mounting substrate 9 is covered by the resin layer 5.

The mounting substrate 9 has a through-conductive portion 96 (see FIG. 8) formed along the thickness direction D1 of the mounting substrate 9. The through-conductive portion 96 has a first end surface and a second end surface opposite to each other in the thickness direction D1 of the mounting substrate 9. The first end surface of the through-conductive portion 96 is included in the first main surface 91 of the mounting substrate 9. The second end surface of the through-conductive portion 96 is included in the second main surface 92 of the mounting substrate 9. The through-conductive portion 96 is connected to the power amplifier 111. In plan view in the thickness direction D1 of the mounting substrate 9, the through-conductive portion 96 overlaps with the power amplifier 111. The multiple outer connection terminals 8 disposed on the second main surface 92 of the mounting substrate 9 include a heat dissipation terminal 86 (see FIG. 8) connected to the through-conductive portion 96. The heat dissipation terminal 86 is separated from the controller 115.

In the radio frequency module 100c, the transmission filter 131 overlaps with the reception filter 171 in plan view in the thickness direction D1 of the mounting substrate 9. In the radio frequency module 100c, part of the transmission filter 131 overlaps with part of the recess 911 and part of the reception filter 171 in plan view in the thickness direction D1 of the mounting substrate 9. However, the present disclosure is not limited thereto, and the entirety of the transmission filter 131 may overlap with part of the recess 911 and the entirety of the reception filter 171. Further, the entirety of the transmission filter 131 may overlap with part of the recess 911 and part of the reception filter 171, or the entirety of the reception filter 171 may overlap with part of the recess 911 and part of the transmission filter 131.

In the radio frequency module 100c, a pass band of the transmission filter 131 and a pass band of the reception filter 171 overlap with each other. In the radio frequency module 100c, the same as in the radio frequency module 100, the transmission filter 131 is a filter whose pass band is the transmission band of the first communication band. The reception filter 171 is a filter whose pass band is the reception band of the first communication band.

In the radio frequency module 100c, the first main surface 91 of the mounting substrate 9 further has a second recess 912 and a third recess 913 in addition to the first recess 911 being the recess 911. The second recess 912 and the third recess 913 are separated from the first recess 911. The depth Dp1 of the first recess 911, a depth Dp2 of the second recess 912, and a depth Dp3 of the third recess 913 are the same, but are not limited thereto, and may be different from each other.

In the radio frequency module 100c, the inductor 1230, which is a surface-mount electronic component 4 having multiple outer electrodes 45, is positioned inside the second recess 912. The surface-mount electronic component 4 is not in contact with the conductive layer 6 being the conductive member 3. More specifically, the main surface of the surface-mount electronic component 4 on the side opposite to the mounting substrate 9 is not in contact with the conductive layer 6 being the conductive member 3. Further, the main surface of the surface-mount electronic component 4 on the side opposite to the mounting substrate 9 is covered by the resin layer 5. The entirety of the inductor 1230 overlaps with the second recess 912 in plan view in the thickness direction D1 of the mounting substrate 9. More specifically, the entirety of the inductor 1230 overlaps with part of the second recess 912 in plan view in the thickness direction D1 of the mounting substrate 9. The surface-mount electronic component 4 is surface-mounted on the first main surface 91 of the mounting substrate 9 by being bonded to the mounting substrate 9 with the multiple bonding portions 39 corresponding to the multiple outer electrodes 45 on a one-to-one basis. The material of the bonding portion 39 is solder, for example.

Further, in the radio frequency module 100c, of the transmission filter 131 (filter 1), the transmission filter 132, and the reception filter 172 mounted on the first main surface 91 of the mounting substrate 9, only part of the transmission filter 131 is positioned inside the recess 911, and part of the reception filter 172 is positioned inside the third recess 913. In the radio frequency module 100c, the entirety of the reception filter 172 overlaps with part of the third recess 913 in plan view in the thickness direction D1 of the mounting substrate 9.

In the radio frequency module 100c, a main surface 1321 of the transmission filter 132 on the side opposite to the mounting substrate 9 is in contact with the conductive layer 6. A thickness of the transmission filter 132 is less than a thickness of the transmission filter 131 by an amount corresponding to the depth Dp1 of the recess 911. An outer peripheral surface 1323 of the transmission filter 132 is covered by the resin layer 5.

In the radio frequency module 100c, the main surface 11 of the filter 1 is in contact with the conductive member 3 (conductive layer 6) the same as in the radio frequency module 100 according to Embodiment 1. This makes it possible to suppress the temperature rise of the filter 1. Further, in the radio frequency module 100c, part of the filter 1 is positioned inside the recess 911 the same as in the radio frequency module 100 according to Embodiment 1. This makes it possible to reduce the radio frequency module 100c in height.

Further, in the radio frequency module 100c, the transmission filter 131, the recess 911, and the reception filter 171 overlap with each other in plan view in the thickness direction D1 of the mounting substrate 9 as described above. This makes it possible to shorten a length of a wiring line between the transmission filter 131 and the reception filter 171. With this, in the radio frequency module 100c, the stray capacitance due to the wiring line between the transmission filter 131 and the reception filter 171 may be reduced. This makes it possible to improve the filter characteristic of the transmission filter 131 and the filter characteristic of the reception filter 171.

Further, in the radio frequency module 100c, the surface-mount electronic component 4 is not in contact with the conductive layer 6 and part of the surface-mount electronic component 4 is positioned inside the second recess 912. This makes it possible to increase the inductance of the inductor 1230 being the surface-mount electronic component 4, while reducing in height.

Embodiment 3

Figure 10:
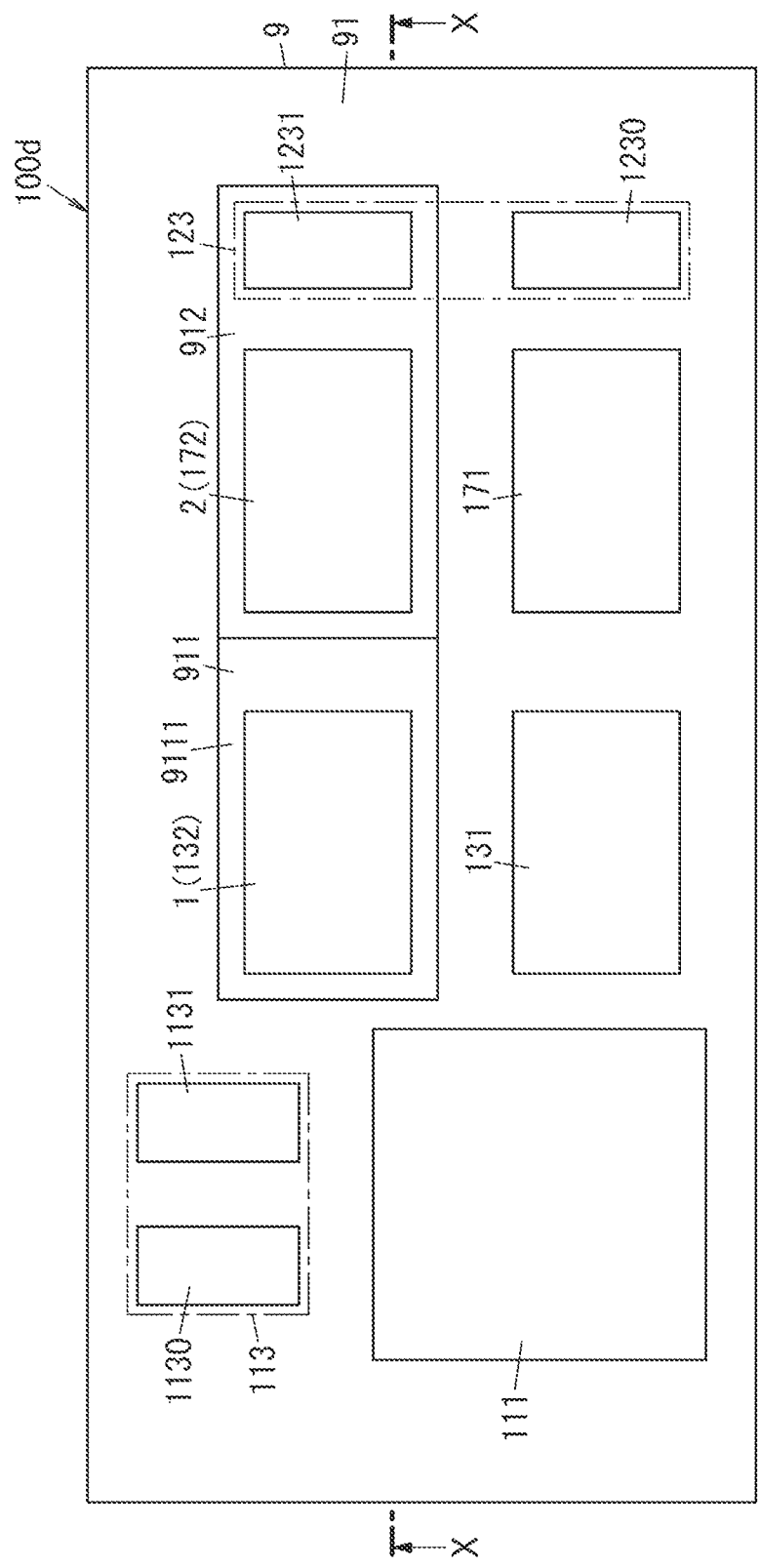
FIG. 10 is a plan view of a radio frequency module according to Embodiment 3.
Figure 11:
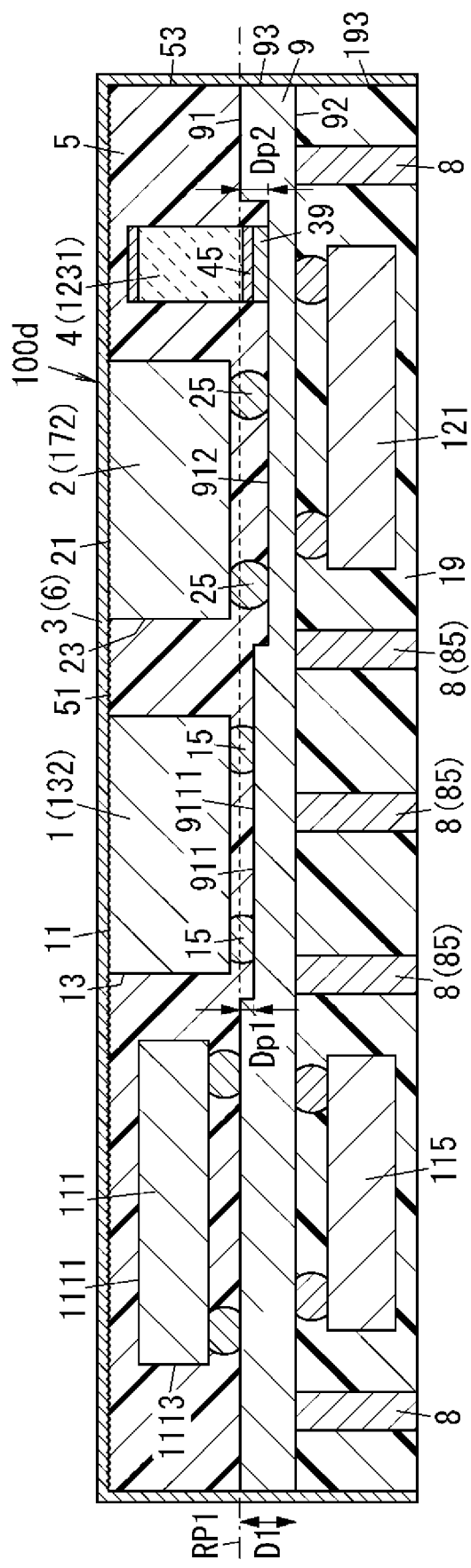
FIG. 11 is a sectional view of the radio frequency module according to Embodiment 3 taken along a line X-X in FIG. 10.

A radio frequency module 100d according to Embodiment 3 will be described with reference to FIG. 10 and FIG. 11. With respect to the radio frequency module 100d according to Embodiment 3, the same constituent elements as those of the radio frequency module 100 according to Embodiment 1 are denoted by the same symbols, and a description thereof is omitted.

The radio frequency module 100d according to Embodiment 3 is different from the radio frequency module 100 according to Embodiment 1 in that the transmission filter 132 constitutes the filter 1. Further, the radio frequency module 100d is different from the radio frequency module 100 according to Embodiment 1 in that part of the transmission filter 132 is positioned inside the recess 911 of the first main surface 91 of the mounting substrate 9, and the transmission filter 131, the reception filter 171, and the reception filter 172 are not positioned inside the first recess 911. Further, the radio frequency module 100d is different from the radio frequency module 100 according to Embodiment 1 in that the reception filter 172 constitutes the electronic component 2.

In the radio frequency module 100d, the entirety of the transmission filter 132 overlaps with the recess 911 of the first main surface 91 of the mounting substrate 9, and the transmission filter 131, the reception filter 171, and the reception filter 172 do not overlap with the recess 911 in plan view in the thickness direction D1 of the mounting substrate 9.

In the radio frequency module 100d, the first main surface 91 of the mounting substrate 9 further has the second recess 912 in addition to the first recess 911 being the recess 911. The depth Dp2 of the second recess 912 is greater than the depth Dp1 of the first recess 911. The first recess 911 and the second recess 912 are connected to each other.

In the radio frequency module 100d, the inductor 1231, which is the surface-mount electronic component 4 having the multiple outer electrodes 45, is positioned inside the second recess 912. The surface-mount electronic component 4 is not in contact with the conductive layer 6 being the conductive member 3. More specifically, the main surface of the surface-mount electronic component 4 on the side opposite to the mounting substrate 9 is not in contact with the conductive layer 6 being the conductive member 3. Further, the main surface of the surface-mount electronic component 4 on the side opposite to the mounting substrate 9 is covered by the resin layer 5. The entirety of the inductor 1231 overlaps with the second recess 912 in plan view in the thickness direction D1 of the mounting substrate 9. More specifically, the entirety of the inductor 1231 overlaps with part of the second recess 912 in plan view in the thickness direction D1 of the mounting substrate 9. The surface-mount electronic component 4 is surface-mounted on the first main surface 91 of the mounting substrate 9 by being bonded to the mounting substrate 9 with the multiple bonding portions 39 corresponding to the multiple outer electrodes 45 on a one-to-one basis. The material of the bonding portion 39 is solder, for example.

Further, in the radio frequency module 100d, part of the reception filter 172 is positioned inside the second recess 912. In the radio frequency module 100d, the entirety of the reception filter 172 overlaps with part of the second recess 912 in plan view in the thickness direction D1 of the mounting substrate 9.

In the radio frequency module 100d according to Embodiment 3, the main surface 11 of the filter 1 is in contact with the conductive member 3 (conductive layer 6) the same as in the radio frequency module 100 according to Embodiment 1. This makes it possible to suppress the temperature rise of the filter 1. Further, in the radio frequency module 100d, part of the filter 1 is positioned inside the recess 911 the same as in the radio frequency module 100 according to Embodiment 1. This makes it possible to reduce the radio frequency module 100d in height.

Further, in the radio frequency module 100d, the surface-mount electronic component 4 is not in contact with the conductive layer 6, and part of the surface-mount electronic component 4 is positioned inside the second recess 912. This makes it possible to increase the inductance of the inductor 1231 being the surface-mount electronic component 4, while reducing in height.

Further, in the radio frequency module 100d, part of the reception filter 172 and part of the inductor 1231 are positioned inside the second recess 912. This makes it possible to shorten a wiring line between the reception filter 172 and the inductor 1231. Further, in the radio frequency module 100d, the wiring line between the reception filter 172 and the low-noise amplifier 121 may be shortened, and the stray capacitance due to the wiring line between the reception filter 172 and the low-noise amplifier 121 may be reduced. This makes it possible to improve at least one of the filter characteristic of the reception filter 172 and the NF of the low-noise amplifier 121.

Embodiment 4

Figure 12:
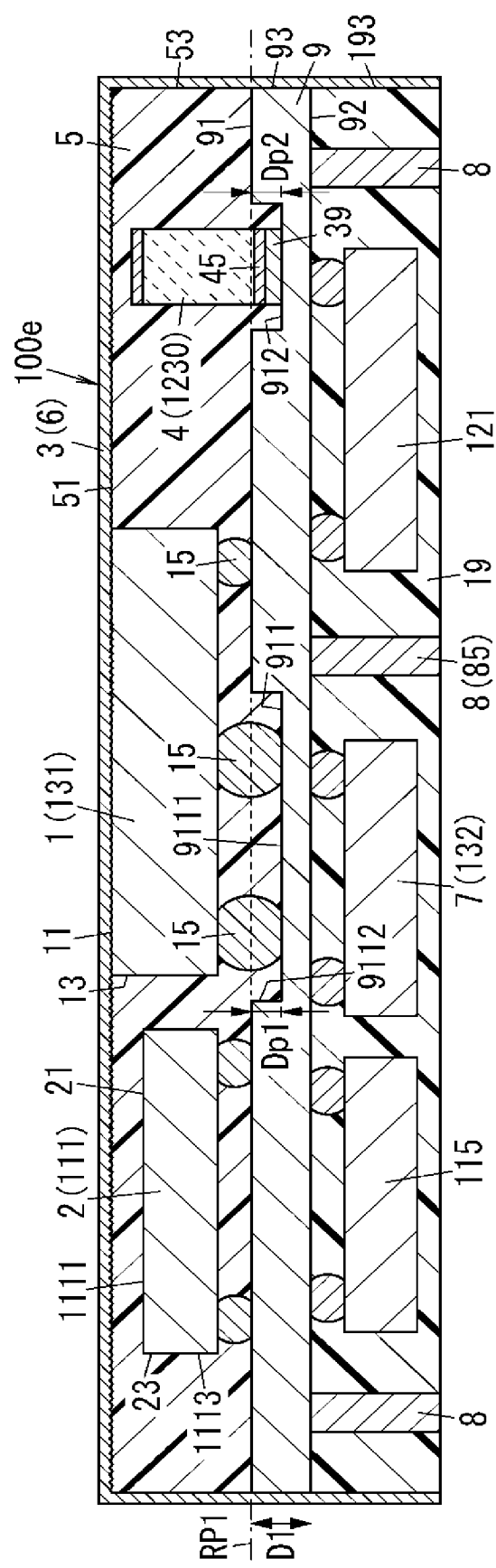
FIG. 12 is a sectional view of a radio frequency module according to Embodiment 4.

A radio frequency module 100e according to Embodiment 4 will be described with reference to FIG. 12. With respect to the radio frequency module 100e according to Embodiment 4, the same constituent elements as those of the radio frequency module 100c according to Embodiment 2 are denoted by the same symbols, and a description thereof is omitted.

In the radio frequency module 100e, only part of the transmission filter 131 (filter 1) overlaps with the recess 911 in plan view in the thickness direction D1 of the mounting substrate 9. In the radio frequency module 100e, some of the multiple outer electrodes 15 of the filter 1 are positioned inside the recess 911, and the remaining outer electrodes 15 are not positioned inside the recess 911. Among the multiple outer electrodes 15, the thickness of the outer electrode 15 not positioned inside the recess 911 is less than that of the outer electrode 15 positioned inside the recess 911 by an amount of the depth Dp1 of the recess 911.

Further, the radio frequency module 100e is different from the radio frequency module 100c according to Embodiment 2 in that the transmission filter 132 is mounted on the second main surface 92 of the mounting substrate 9. In the radio frequency module 100e, the transmission filter 132 constitutes an electronic component 7 mounted on the second main surface 92 of the mounting substrate 9. In the radio frequency module 100e, the filter 1 is the first transmission filter 131 whose pass band is the transmission band of the first communication band, and the electronic component 7 is the second transmission filter 132 whose pass band is the transmission band of the second communication band.

In the radio frequency module 100e according to Embodiment 4, the main surface 11 of the filter 1 is in contact with the conductive member 3 (conductive layer 6) the same as in the radio frequency module 100c according to Embodiment 2. This makes it possible to suppress the temperature rise of the filter 1. Further, in the radio frequency module 100e, part of the filter 1 is positioned inside the recess 911 the same as the radio frequency module 100c according to Embodiment 2. This makes it is possible to reduce the radio frequency module 100e in height.

In the radio frequency module 100e, the transmission filter 131 (filter 1) overlaps with the recess 911 and the transmission filter 132 (electronic component 7) in plan view in the thickness direction D1 of the mounting substrate 9. With this, in the radio frequency module 100e, a length of the wiring line between the first transmission filter 131 and the second transmission filter 132 may be shortened. With this, in the radio frequency module 100e, the stray capacitance due to the wiring line between the first transmission filter 131 and the second transmission filter 132 may be reduced. This makes it possible to improve the filter characteristic of each of the first transmission filter 131 and the second transmission filter 132, when simultaneous transmission using the first transmission filter 131 and the second transmission filter 132 is carried out, for example.

Embodiment 5

Figure 13:
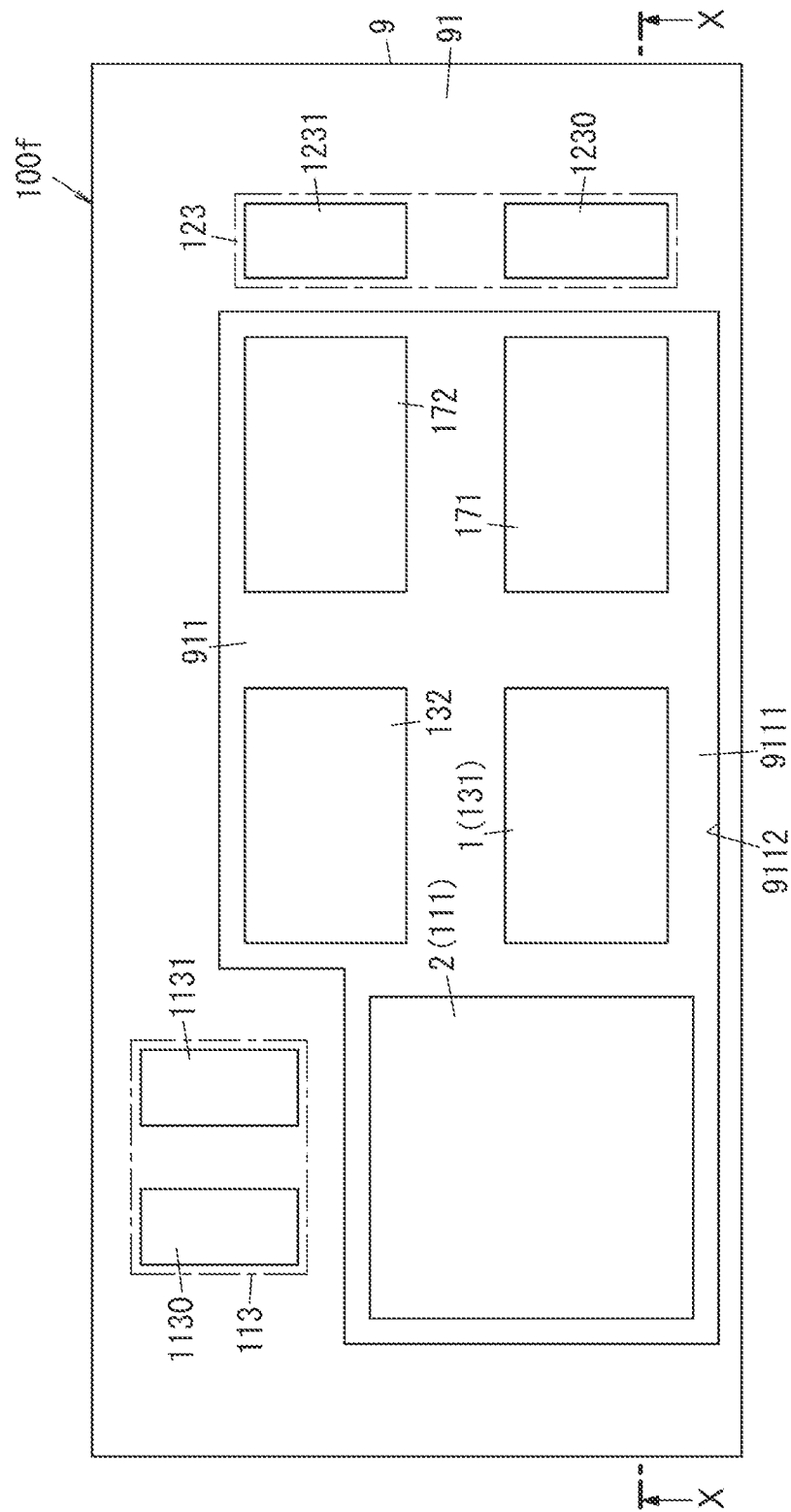
FIG. 13 is a plan view of a radio frequency module according to Embodiment 5.
Figure 14:
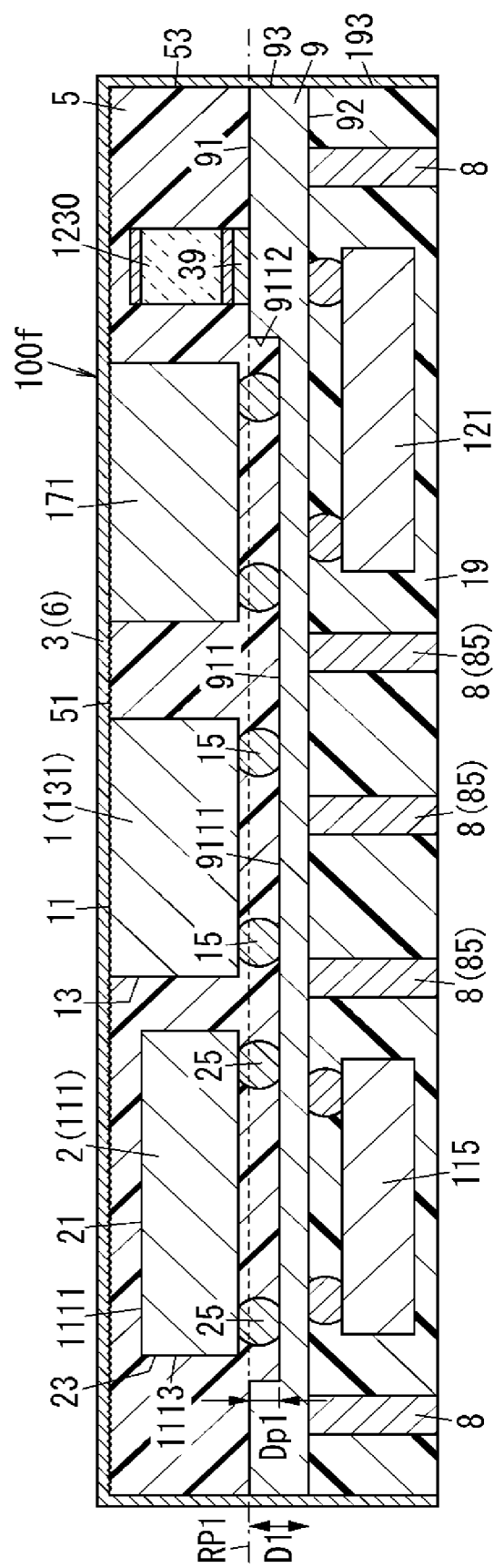
FIG. 14 is a sectional view of the radio frequency module according to Embodiment 5 taken along a line X-X in FIG. 13.

A radio frequency module 100f according to Embodiment 5 will be described with reference to FIG. 13 and FIG. 14. With respect to the radio frequency module 100f according to Embodiment 5, the same constituent elements as those of the radio frequency module 100 according to Embodiment 1 are denoted by the same symbols, and a description thereof is omitted.

The radio frequency module 100f is different from the radio frequency module 100 according to Embodiment 1 in that part of the power amplifier 111 is also positioned inside the recess 911. In plan view in the thickness direction D1 of the mounting substrate 9, the entirety of the power amplifier 111 overlaps with part of the recess 911. In the radio frequency module 100f, the power amplifier 111 is not in contact with the conductive member 3 (conductive layer 6). In the radio frequency module 100f, the power amplifier 111 constitutes the electronic component 2.

In the radio frequency module 100f according to Embodiment 5, the main surface 11 of the filter 1 is in contact with the conductive member 3 (conductive layer 6) the same as in the radio frequency module 100 according to Embodiment 1. This makes it possible to suppress the temperature rise of the filter 1. Further, in the radio frequency module 100f, part of the filter 1 is positioned inside the recess 911 the same as in the radio frequency module 100 according to Embodiment 1. This makes it possible to reduce the radio frequency module 100f in height.

In the radio frequency module 100f according to Embodiment 5, since part of the power amplifier 111 is positioned inside the recess 911, the heat generated in the power amplifier 111 is easily dissipated through the through-conductive portion formed along the thickness direction D1 of the mounting substrate 9.

(Other Modifications)

Each of the above-described Embodiment 1 to Embodiment 5 and the like is merely one of various embodiments of the present disclosure. The above-described Embodiment 1 to Embodiment 5 and the like may be variously modified in accordance with the design or the like as long as the possible benefit of the present disclosure may be achieved, and mutually different constituent elements of mutually different embodiments may appropriately be combined.

In each of the radio frequency modules 100, 100*a*, 100*b*, 100*c*, 100*d*, 100*e*, and 100*f*, the resin layer 5 does not necessarily cover the entirety of the outer peripheral surface 13 of the filter 1, and it is sufficient that the resin layer 5 covers at least part of the outer peripheral surface 13. Further, the resin layer 5 does not necessarily cover the entirety of the outer peripheral surface 23 of the electronic component 2, and it is sufficient that the resin layer 5 covers at least part of the outer peripheral surface 23.

Furthermore, in each of the radio frequency modules 100, 100*a*, 100*b*, 100*c*, 100*d*, 100*e*, and 100*f*, the conductive layer 6 does not necessarily cover the entirety of the main surface 51 of the resin layer 5, and it is sufficient that the conductive layer 6 covers at least part of the main surface 51 of the resin layer 5. Still furthermore, the conductive layer 6 does not necessarily cover the entirety of the main surface 11 of the filter 1, and it is sufficient that the conductive layer 6 covers at least part of the main surface 11 of the filter 1. Still furthermore, in the radio frequency modules 100, 100*a*, 100*b*, 100*d*, and 100*f*, the conductive layer 6 does not necessarily cover the entirety of the main surface 21 of the electronic component 2, and it is sufficient that the conductive layer 6 covers at least part of the main surface 21 of the electronic component 2.

The conductive member 3 is not limited to the conductive layer 6, and may be a metal cap, for example. The metal cap has a rectangular plate-shaped ceiling wall portion and an outer peripheral wall portion. The rectangular plate-shaped ceiling wall portion is positioned apart from the first main surface 91 of the mounting substrate 9 in the thickness direction D1 of the mounting substrate 9. The outer peripheral wall portion surrounds the outer peripheral surface 93 of the mounting substrate 9 and the circuit components such as the filter 1 mounted on the first main surface 91 of the mounting substrate 9. The metal cap is in contact with the main surface 11 of the filter 1 at the ceiling wall portion, and is connected to the ground layer of the mounting substrate 9 at the outer peripheral surface 93 of the mounting substrate 9.

Further, in the radio frequency modules 100, 100*a*, 100*b*, 100*c*, 100*d*, 100*e*, and 100*f*, the second group circuit components mounted on the second main surface 92 of the mounting substrate 9 may be mounted on the first main surface 91 instead of the second main surface 92 of the mounting substrate 9. In this case, no circuit component is mounted on the second main surface 92 of the mounting substrate 9 in the radio frequency modules 100, 100*a*, 100*b*, 100*c*, 100*d*, 100*e*, and 100*f*.

Further, each of the multiple transmission filters 131 and 132 and the multiple reception filters 171 and 172 is not limited to a surface acoustic wave filter, and may be a bulk acoustic wave (BAW) filter, for example. The resonator in the BAW filter is a film bulk acoustic resonator (FBAR) or a solidly mounted resonator (SMR), for example. The BAW filter has a substrate. The substrate is a silicon substrate, for example.

Further, each of the multiple transmission filters 131 and 132 and the multiple reception filters 171 and 172 is not limited to a ladder filter, and may be a longitudinally coupled resonator-type surface acoustic wave filter, for example.

Furthermore, the acoustic wave filter described above uses a surface acoustic wave or a bulk acoustic wave, but is not limited thereto, and may use a boundary acoustic wave, a plate wave, or the like, for example.

Figure 4:
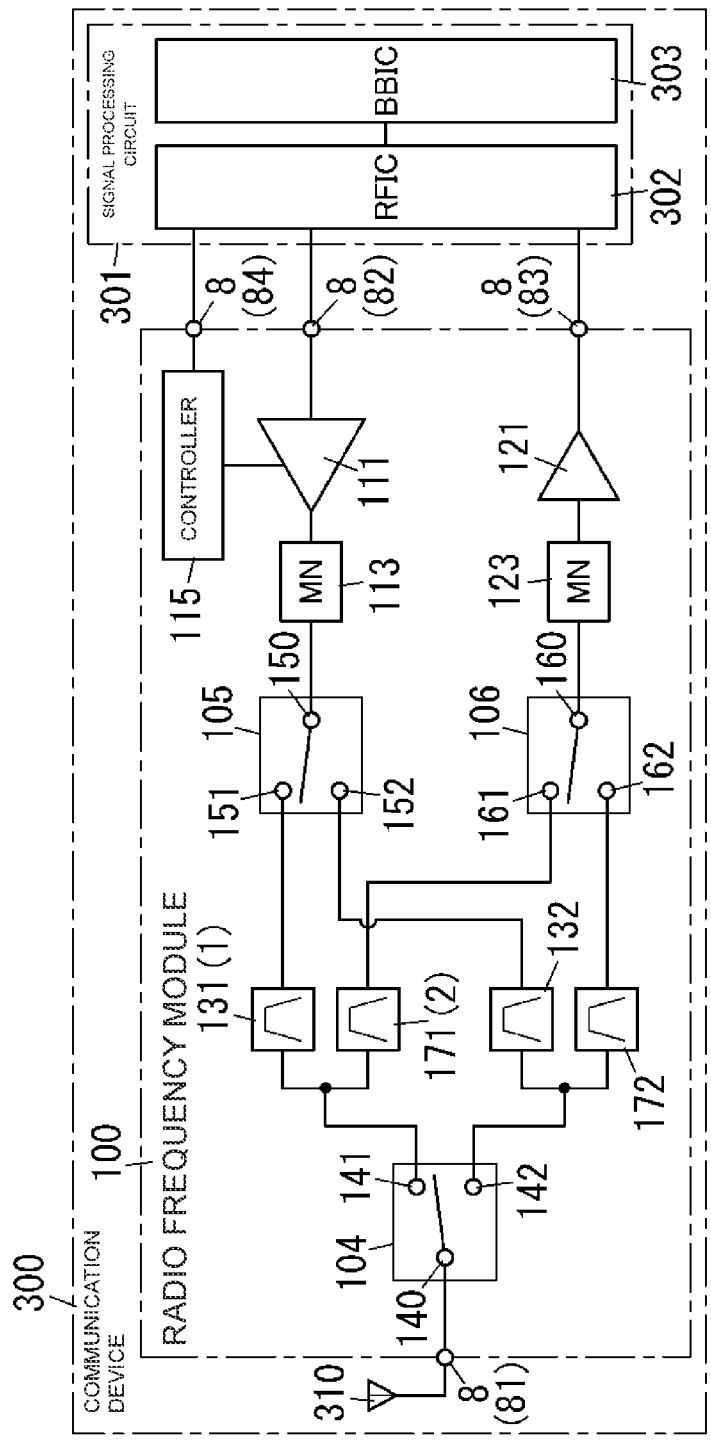
FIG. 4 is a circuit configuration diagram of a communication device including the radio frequency module according to Embodiment 1.

The circuit configuration of the radio frequency modules 100 to 100*f* is not limited to the example in FIG. 4 described above. Further, the radio frequency modules 100 to 100*f* may include a multiple-input and multiple-output (MIMO) compatible radio frequency front end circuit as a circuit configuration, for example.

Furthermore, the communication device 300 according to Embodiment 1 may include any one of the radio frequency modules 100*a*, 100*b*, 100*c*, 100*d*, 100*e*, and 100*f* instead of the radio frequency module 100.

(Aspect)

The following aspects are disclosed in the present description.

A radio frequency module (100; 100*a*; 100*b*; 100*c*; 100*d*; 100*e*; 100*f*) according to a first aspect includes a mounting substrate (9), a filter (1), and a conductive member (3). The mounting substrate (9) has a first main surface (91) and a second main surface (92) opposite to each other. The filter (1) is mounted on the first main surface (91) of the mounting substrate (9). The conductive member (3) covers at least part of a main surface (11) of the filter (1) on a side opposite to the mounting substrate (9). The first main surface (91) of the mounting substrate (9) has a recess (911). The main surface (11) of the filter (1) is in contact with the conductive member (3). At least part of the filter (1) is positioned inside the recess (911).

The radio frequency module (100; 100*a*; 100*b*; 100*c*; 100*d*; 100*e*; 100*f*) according to the first aspect may be reduced in height.

In a radio frequency module (100; 100*a*; 100*b*; 100*c*; 100*d*; 100*e*; 100*f*) according to a second aspect, the filter (1) has multiple outer electrodes (15) connected to the first main surface (91) of the mounting substrate (9), in the first aspect. At least one outer electrode (15) of the multiple outer electrodes (15) is positioned inside the recess (911).

In a radio frequency module (100; 100*a*; 100*b*; 100*c*; 100*d*; 100*e*; 100*f*) according to a third aspect, the entirety of the filter (1) overlaps with the recess (911) in plan view in a thickness direction (D1) of the mounting substrate (9), in the first or second aspect.

In the radio frequency module (100; 100*a*; 100*b*; 100*c*; 100*d*; 100*e*; 100*f*) according to the third aspect, the parallelism of the filter (1) relative to the mounting substrate (9) may be increased.

A radio frequency module (100; 100*a*; 100*b*; 100*c*; 100*d*; 100*e*; 100*f*) according to a fourth aspect further includes a resin layer (5), in any one of the first to third aspects. The resin layer (5) is disposed on the first main surface (91) of the mounting substrate (9). The resin layer (5) covers at least part of an outer peripheral surface (13) of the filter (1). The conductive member (3) is a conductive layer (6). Part of the resin layer (5) is positioned inside the recess (911).

In the radio frequency module (100; 100*a*; 100*b*; 100*c*; 100*d*; 100*e*; 100*f*) according to the fourth aspect, the strength of the mounting substrate (9) may be reinforced by the resin layer (5), and the reliability may be improved.

In a radio frequency module (100; 100*a*; 100*b*; 100*c*; 100*d*; 100*e*; 100*f*) according to a fifth aspect, the conductive member (3) covers at least part of a main surface (51) of the resin layer (5) on the side opposite to the mounting substrate (9), in the fourth aspect.

In the radio frequency module (100; 100*a*; 100*b*; 100*c*; 100*d*; 100*e*; 100*f*) according to the fifth aspect, the shielding performance of the conductive member (3) may be improved.

A radio frequency module (100; 100a; 100b; 100d) according to a sixth aspect further includes an electronic component (2), in any one of the first to fifth aspects. The electronic component (2) is mounted on the first main surface (91) of the mounting substrate (9). The filter (1) is a transmission filter (131). The electronic component (2) is a reception filter (171). A main surface (21) of the electronic component (2) on the side opposite to the mounting substrate (9) is in contact with the conductive member (3). At least part of the electronic component (2) is positioned inside the recess (911).

In the radio frequency module (100; 100a; 100b; 100d) according to the sixth aspect, the heat generated in the electronic component (2) is easily dissipated through the conductive member (3).

A radio frequency module (100c; 100e) according to a seventh aspect further includes an electronic component (2), in any one of the first to fifth aspects. The electronic component (2) is mounted on the first main surface (91) of the mounting substrate (9). The electronic component (2) is a power amplifier (111). The electronic component (2) is not in contact with the conductive member (3). The electronic component (2) is not positioned inside the recess (911).

The radio frequency module (100c; 100e) according to the seventh aspect may suppress the heat generated in the power amplifier (111) to be transferred to the filter (1) via the conductive member (3).

In the radio frequency module (100c; 100e) according to the seventh aspect, a size of the recess (911) may be reduced in a plan view in the thickness direction (D1) of the mounting substrate (9) as compared with a case that the electronic component (2) is positioned inside the recess (911), and the strength of the mounting substrate (9) may be improved.

A radio frequency module (100f) according to an eighth aspect further includes an electronic component (2), in any one of the first to fifth aspects. The electronic component (2) is mounted on the first main surface (91) of the mounting substrate (9). The electronic component (2) is not in contact with the conductive member (3). At least part of the electronic component (2) is positioned inside the recess (911).

In the radio frequency module (100f) according to the eighth aspect, the heat generated in the electronic component (2) is easily dissipated through the mounting substrate (9).

A radio frequency module (100; 100a; 100b; 100d) according to a ninth aspect further includes a low-noise amplifier (121), in the sixth aspect. The low-noise amplifier (121) is mounted on the second main surface (92) of the mounting substrate (9). The electronic component (2) is a reception filter (171). The electronic component (2) overlaps with the recess (911) and the low-noise amplifier (121) in plan view in the thickness direction (D1) of the mounting substrate (9).

In the radio frequency module (100; 100a; 100b; 100d) according to the ninth aspect, a length of a wiring line between the reception filter (171) and the low-noise amplifier (121) may be shortened. With this, in the radio frequency module (100; 100a; 100b; 100d), the stray capacitance due to the wiring line between the reception filter (171) and the low-noise amplifier (121) may be reduced. This makes it possible to improve at least one of the filter characteristic of the reception filter (171) and the NF of the low-noise amplifier (121).

The radio frequency module (100c) according to a tenth aspect further includes a reception filter (171), in any one of the first to fifth aspects. The reception filter (171) is mounted on the second main surface (92) of the mounting substrate (9). The filter (1) is a transmission filter (131). The filter (1) overlaps with the recess (911) and the reception filter (171) in plan view in the thickness direction (D1) of the mounting substrate (9). The pass band of the filter (1) and the pass band of the reception filter (171) overlap with each other.

In the radio frequency module (100c) according to the tenth aspect, a length of a wiring line between the transmission filter (131) and the reception filter (171) may be shortened. With this, in the radio frequency module (100c), the stray capacitance due to the wiring line between the transmission filter (131) and the reception filter (171) may be reduced. This makes it possible to improve the filter characteristic of the transmission filter (131) and the filter characteristic of the reception filter (171).

A radio frequency module (100e) according to an eleventh aspect further includes an electronic component (7) mounted on the second main surface (92) of the mounting substrate (9), in any one of the first to fifth aspects. The filter (1) is a first transmission filter (131) whose pass band is a transmission band of a first communication band. The electronic component (7) is a second transmission filter (132) whose pass band is a transmission band of a second communication band. The filter (1) overlaps with the recess (911) and the electronic component (7) in plan view in the thickness direction (D1) of the mounting substrate (9).

In the radio frequency module (100e) according to the eleventh aspect, a length of a wiring line between the first transmission filter (131) and the second transmission filter (132) may be shortened. With this, in the radio frequency module (100e), the stray capacitance due to the wiring line between the first transmission filter (131) and the second transmission filter (132) may be reduced. This makes it possible to improve the filter characteristic of each of the first transmission filter (131) and the second transmission filter (132), when simultaneous transmission using the first transmission filter (131) and the second transmission filter (132) is carried out, for example.

In a radio frequency module (100; 100a; 100b; 100c; 100d; 100e; 100f) according to a twelfth aspect, the filter (1) is an acoustic wave filter, in any one of the first to eleventh aspects.

A radio frequency module (100c; 100d; 100e) according to a thirteenth aspect further includes a surface-mount electronic component (4) having multiple outer electrodes (45), in any one of the first to twelfth aspects. The surface-mount electronic component (4) is mounted on the first main surface (91) of the mounting substrate (9). The first main surface (91) of the mounting substrate (9) further has a second recess (912) in addition to the first recess (911) being the recess (911). The surface-mount electronic component (4) is not in contact with the conductive member (3). At least part of the surface-mount electronic component (4) is positioned inside the second recess (912).

In the radio frequency module (100c; 100d; 100e) according to the thirteenth aspect, the surface-mount electronic component (4) is not in contact with the conductive member (3). This makes it possible to prevent the multiple outer electrodes (45) of the surface-mount electronic component (4) from being short-circuited with each other, and to increase a degree of freedom in a shape of each of the multiple outer electrodes (45) of the surface-mount electronic component (4). Further, in the radio frequency module (100c; 100d; 100e) according to the thirteenth aspect, at least part of the surface-mount electronic component (4) is positioned in the second recess (912). This makes it possible to increase the height of the surface-mount electronic component (4) in the thickness direction (D1) of the mounting substrate (9), and to increase the device value of the surface-mount electronic component (4).

In a radio frequency module (100d) according to a fourteenth aspect, a depth (Dp2) of the second recess (912) is greater than a depth (Dp1) of the first recess (911), in the thirteenth aspect.

The radio frequency module (100d) according to the fourteenth aspect may employ a surface-mount electronic component (4) having a larger thickness in the thickness direction (D1) of the mounting substrate (9). This makes it possible to further increase the device value of the surface-mount electronic component (4).

In a radio frequency module (100d) according to a fifteenth aspect, the first recess (911) and the second recess (912) are connected to each other, in the thirteenth or fourteenth aspect.

The radio frequency module (100d) according to the fifteenth aspect may be reduced in size as compared with a case that the first recess (911) and the second recess (912) are separated from each other.

In a radio frequency module (100c; 100d; 100e) according to a sixteenth aspect, the surface-mount electronic component (4) is an inductor (1230; 1231), in any one of the thirteenth to fifteenth aspects.

In the radio frequency module (100c; 100d; 100e) according to the sixteenth aspect, the inductance, being the device value of the inductor (1230; 1231), may be increased.

A radio frequency module (100; 100a; 100b; 100c; 100d; 100e; 100f) according to a seventeenth aspect further includes multiple outer connection terminals (8), in any one of the first to sixteenth aspects. The multiple outer connection terminals (8) are disposed on the second main surface (92) of the mounting substrate (9). The multiple outer connection terminals (8) include a ground terminal (85) connected to the conductive member (3).

In the radio frequency module (100; 100a; 100b; 100c; 100d; 100e; 100f) according to the seventeenth aspect, electric potential of the conductive member (3) may be made substantially the same as electric potential of the ground terminal (85).

In a radio frequency module (100; 100a; 100b; 100c; 100d; 100e; 100f) according to an eighteenth aspect, the mounting substrate (9) is a multilayer substrate, in any one of the first to seventeenth aspects. The multilayer substrate includes multiple first dielectric layers (97) and multiple second dielectric layers (98). The multiple first dielectric layers (97) are positioned on a side of the first main surface (91) of the first main surface (91) and the second main surface (92) in the thickness direction (D1) of the mounting substrate (9). The multiple second dielectric layers (98) are positioned on a side of the second main surface (92) of the first main surface (91) and the second main surface (92) in the thickness direction (D1) of the mounting substrate (9). The recess (911) is formed across the multiple first dielectric layers (97) in the thickness direction (D1) of the mounting substrate (9).

In the radio frequency module (100; 100a; 100b; 100c; 100d; 100e; 100f) according to the eighteenth aspect, a depth (Dp1) of the recess (911) of the mounting substrate (9) may be determined by the number of the first dielectric layers (97) having a through-hole for forming the recess (911).

In the radio frequency module (100; 100a; 100b; 100c; 100d; 100e; 100f) according to a nineteenth aspect, the depth (Dp1) of the recess (911) is greater than half the thickness of the mounting substrate (9), in the eighteenth aspect.

The radio frequency module (100; 100a; 100b; 100c; 100d; 100e; 100f) according to the nineteenth aspect may further be reduced in height.

A communication device (300) according to a twentieth aspect includes the radio frequency module (100; 100a; 100b; 100c; 100d; 100e; 100f) according to any one of the first to nineteenth aspects, and a signal processing circuit (301). The signal processing circuit (301) is connected to the radio frequency module (100; 100a; 100b; 100c; 100d; 100e; 100f).

The communication device (300) according to the twentieth aspect may be reduced in height.

1 FILTER
11 MAIN SURFACE
13 OUTER PERIPHERAL SURFACE
15 OUTER ELECTRODE
101 SUBSTRATE
1011 FIRST MAIN SURFACE
1012 SECOND MAIN SURFACE
1014 CIRCUIT PORTION
1015 IDT ELECTRODE
1017 SPACER LAYER
1018 COVER MEMBER
1020 LOW ACOUSTIC VELOCITY FILM
1030 PIEZOELECTRIC LAYER
1050 INSULATION LAYER
2 ELECTRONIC COMPONENT
21 MAIN SURFACE
23 OUTER PERIPHERAL SURFACE
25 OUTER ELECTRODE
201 SUBSTRATE
2011 FIRST MAIN SURFACE
2012 SECOND MAIN SURFACE
2014 CIRCUIT PORTION
2015 IDT ELECTRODE
2017 SPACER LAYER
2018 COVER MEMBER
2020 LOW ACOUSTIC VELOCITY FILM
2030 PIEZOELECTRIC LAYER
2050 INSULATION LAYER
3 CONDUCTIVE MEMBER
4 SURFACE-MOUNT ELECTRONIC COMPONENT
45 OUTER ELECTRODE
5 RESIN LAYER (FIRST RESIN LAYER)
51 MAIN SURFACE
53 OUTER PERIPHERAL SURFACE
54 PART OF RESIN LAYER
55 UNDERFILL PORTION
551 PART OF UNDERFILL PORTION
56 UNDERFILL PORTION
561 PART OF UNDERFILL PORTION
6 CONDUCTIVE LAYER
7 ELECTRONIC COMPONENT
8 OUTER CONNECTION TERMINAL
81 ANTENNA TERMINAL
82 SIGNAL INPUT TERMINAL
83 SIGNAL OUTPUT TERMINAL
84 CONTROL TERMINAL
85 GROUND TERMINAL
86 HEAT DISSIPATION TERMINAL
9 MOUNTING SUBSTRATE
91 FIRST MAIN SURFACE
911 RECESS (FIRST RECESS)
9111 BOTTOM SURFACE
912 SECOND RECESS
913 THIRD RECESS
92 SECOND MAIN SURFACE

93 OUTER PERIPHERAL SURFACE
96 THROUGH-CONDUCTIVE PORTION
97 FIRST DIELECTRIC LAYER
98 SECOND DIELECTRIC LAYER
19 SECOND RESIN LAYER
104 FIRST SWITCH
140 COMMON TERMINAL
141, 142 SELECTION TERMINAL
105 SECOND SWITCH
150 COMMON TERMINAL
151, 152 SELECTION TERMINAL
106 THIRD SWITCH
160 COMMON TERMINAL
161, 162 SELECTION TERMINAL
108 IC CHIP
111 POWER AMPLIFIER
113 OUTPUT MATCHING CIRCUIT
114 MATCHING CIRCUIT
115 CONTROLLER
121 LOW-NOISE AMPLIFIER
123 INPUT MATCHING CIRCUIT
131 TRANSMISSION FILTER (FIRST TRANSMISSION FILTER)
132 TRANSMISSION FILTER (SECOND TRANSMISSION FILTER)
171 RECEPTION FILTER (FIRST RECEPTION FILTER)
172 RECEPTION FILTER (SECOND RECEPTION FILTER)
100, 100a, 100b, 100c, 100d, 100e, 100f RADIO FREQUENCY MODULE
300 COMMUNICATION DEVICE
301 SIGNAL PROCESSING CIRCUIT
302 RF SIGNAL PROCESSING CIRCUIT
303 BASEBAND SIGNAL PROCESSING CIRCUIT
310 ANTENNA
D1 THICKNESS DIRECTION
Dp1 DEPTH
Dp2 DEPTH
Dp3 DEPTH

The invention claimed is:

1. A radio frequency module, comprising:
a mounting substrate having a first main surface and a second main surface opposite to each other;
a filter mounted on the first main surface of the mounting substrate; and
a conductive member covering at least a part of a main surface of the filter on a side opposite to the mounting substrate,
wherein the first main surface of the mounting substrate has a first recess,
the main surface of the filter is in contact with the conductive member, and
at least a part of the filter is positioned inside the first recess.

2. The radio frequency module according to claim 1, wherein the filter has multiple outer electrodes connected to the first main surface of the mounting substrate, and
at least one outer electrode of the multiple outer electrodes is positioned inside the first recess.

3. The radio frequency module according to claim 1, wherein an entirety of the filter overlaps with the first recess in plan view in a thickness direction of the mounting substrate.

4. The radio frequency module according to claim 1, further comprising:
a resin layer disposed on the first main surface of the mounting substrate and covering at least a part of an outer peripheral surface of the filter,
wherein the conductive member is a conductive layer, and
a part of the resin layer is positioned inside the first recess.

5. The radio frequency module according to claim 4, wherein the conductive member covers at least a part of a main surface of the resin layer on the side opposite to the mounting substrate.

6. The radio frequency module according to claim 1, further comprising:
an electronic component mounted on the first main surface of the mounting substrate,
wherein the filter is a transmission filter,
the electronic component is a reception filter,
a main surface of the electronic component on the side opposite to the mounting substrate is in contact with the conductive member, and
at least a part of the electronic component is positioned inside the first recess.

7. The radio frequency module according to claim 1, further comprising:
an electronic component mounted on the first main surface of the mounting substrate,
wherein the electronic component is a power amplifier,
the electronic component is not in contact with the conductive member, and
the electronic component is not positioned inside the first recess.

8. The radio frequency module according to claim 1, further comprising:
an electronic component mounted on the first main surface of the mounting substrate,
wherein the electronic component is not in contact with the conductive member, and
at least a part of the electronic component is positioned inside the first recess.

9. The radio frequency module according to claim 6, further comprising:
a low-noise amplifier mounted on the second main surface of the mounting substrate,
wherein the electronic component is a reception filter, and
the electronic component overlaps with the first recess and the low-noise amplifier in plan view in a thickness direction of the mounting substrate.

10. The radio frequency module according to claim 1, wherein the filter is a transmission filter,
the radio frequency module further comprises a reception filter mounted on the second main surface of the mounting substrate,
the transmission filter overlaps with the first recess and the reception filter in plan view in a thickness direction of the mounting substrate, and
a pass band of the transmission filter and a pass band of the reception filter overlap with each other.

11. The radio frequency module according to claim 1, further comprising:
an electronic component mounted on the second main surface of the mounting substrate,
wherein the filter is a first transmission filter whose pass band is a transmission band of a first communication band,
the electronic component is a second transmission filter whose pass band is a transmission band of a second communication band, and the first transmission filter overlaps with the first recess and the electronic component in plan view in a thickness direction of the mounting substrate.

12. The radio frequency module according to claim 1, wherein the filter is an acoustic wave filter.

13. The radio frequency module according to claim 1, further comprising:
   a surface-mount electronic component having multiple outer electrodes and mounted on the first main surface of the mounting substrate,
   wherein the first main surface of the mounting substrate further has a second recess in addition to the first recess,
   the surface-mount electronic component is not in contact with the conductive member, and
   at least a part of the surface-mount electronic component is positioned inside the second recess.

14. The radio frequency module according to claim 13, wherein a depth of the second recess is greater than a depth of the first recess.

15. The radio frequency module according to claim 13, wherein the first recess and the second recess are connected to each other.

16. The radio frequency module according to claim 13, wherein the surface-mount electronic component is an inductor.

17. The radio frequency module according to claim 1, further comprising:
   multiple outer connection terminals disposed on the second main surface of the mounting substrate,
   wherein the multiple outer connection terminals include a ground terminal connected to the conductive member.

18. The radio frequency module according to claim 1, wherein the mounting substrate is a multilayer substrate, the multilayer substrate includes
   multiple first dielectric layers positioned on a side of the first main surface among the first main surface and the second main surface in a thickness direction of the mounting substrate, and
   multiple second dielectric layers positioned on a side of the second main surface among the first main surface and the second main surface in the thickness direction of the mounting substrate, and
   the first recess is provided across the multiple first dielectric layers in the thickness direction of the mounting substrate.

19. The radio frequency module according to claim 18, wherein a depth of the first recess is greater than a half of a thickness of the mounting substrate.

20. A communication device, comprising:
   the radio frequency module according to claim 1; and
   a signal processing circuit connected to the radio frequency module.

* * * * *